US012624977B1

(12) United States Patent

Mowris

(10) Patent No.: US 12,624,977 B1

(45) **Date of Patent: *May 12, 2026**

(54) SIMPLE AIRFLOW MEASUREMENT METHOD FOR HVAC SYSTEMS

(71) Applicant: Robert J. Mowris, Olympic Valley, CA (US)

(72) Inventor: Robert J. Mowris, Olympic Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/262,301

(22) Filed: Jul. 8, 2025

Related U.S. Application Data

(63) Continuation-in-part of application No. 19/006,672, filed on Dec. 31, 2024, now Pat. No. 12,352,458.

(51) Int. Cl.
| | |
|---|---|
| *G01F 1/688* | (2006.01) |
| *F24F 11/74* | (2018.01) |
| *G01F 1/696* | (2006.01) |

(52) U.S. Cl.
CPC ............ *G01F 1/6888* (2013.01); *F24F 11/74* (2018.01); *G01F 1/696* (2013.01)

(58) Field of Classification Search
None
See application file for complete search history.

(56) References Cited

U.S. PATENT DOCUMENTS

| | | | | | |
|---|---|---|---|---|---|
| 3,357,722 | A | * | 12/1967 | Howard | ................ F16L 13/002 |
| | | | | | 285/109 |
| 7,941,294 | B2 | * | 5/2011 | Shahi | .................... F25B 49/005 |
| | | | | | 702/182 |
| 9,605,857 | B2 | * | 3/2017 | Secor | ................... G05B 19/048 |

FOREIGN PATENT DOCUMENTS

| | | | | |
|---|---|---|---|---|
| JP | | H1038642 | A | * | 2/1998 |

OTHER PUBLICATIONS

"Air Measurement Techniques", HVAC&R Nation, Jun. 2021, pp. 15-17.*

"Area Calculator" by Gigacalculator.com, as downloaded by the Internet Archive Wayback Machine at https://www.gigacalculator.com/calculators/area-calculator.php on Apr. 7, 2024.*

California Energy Commission, Building Energy Efficiency Standards for Residential and Nonresidential Buildings, 2018, https://www.energy.ca.gov/sites/default/files/2021-06/CEC-400-2018-020-CMF_0.pdf.

(Continued)

*Primary Examiner* — Justin N Olamit

(74) *Attorney, Agent, or Firm* — CIONCA IP Law P.C.

(57) ABSTRACT

A method of measuring an HVAC system airflow of an HVAC system having at least one airflow element selected from the group consisting of: an air register, a vent, a grill, a plenum, a duct, an economizer, a condenser, or a box temporarily attached to the HVAC system, wherein the box is in fluid communication and reversibly engaged with the HVAC system, wherein the HVAC system airflow is entering or leaving the least one airflow element. The method comprising drilling a single hole in the at least one airflow element and inserting an anemometer probe in the single hole and taking at least one airflow measurement at a location selected from the group consisting of: a near side airflow, a centerline airflow, a far side airflow, and an airflow between the near and far side; and calculating an average HVAC system airflow, based on the at least one airflow measurement.

19 Claims, 19 Drawing Sheets

Top View

(56) References Cited

OTHER PUBLICATIONS

American Society of Heating, Refrigerating, and Air Conditioning Engineers (ASHRAE), ANSI/ ASHRAE, Standard 62.1-2019, Ventilation for Acceptable Indoor Air Quality, 2019. ASHRAE. Atlanta, GA. USA. https://fire-gas.com/storage/2024/06/ASHRAE-62.1-2019. pdf.

* cited by examiner

Top View

Top View

Top View

Cross Section View

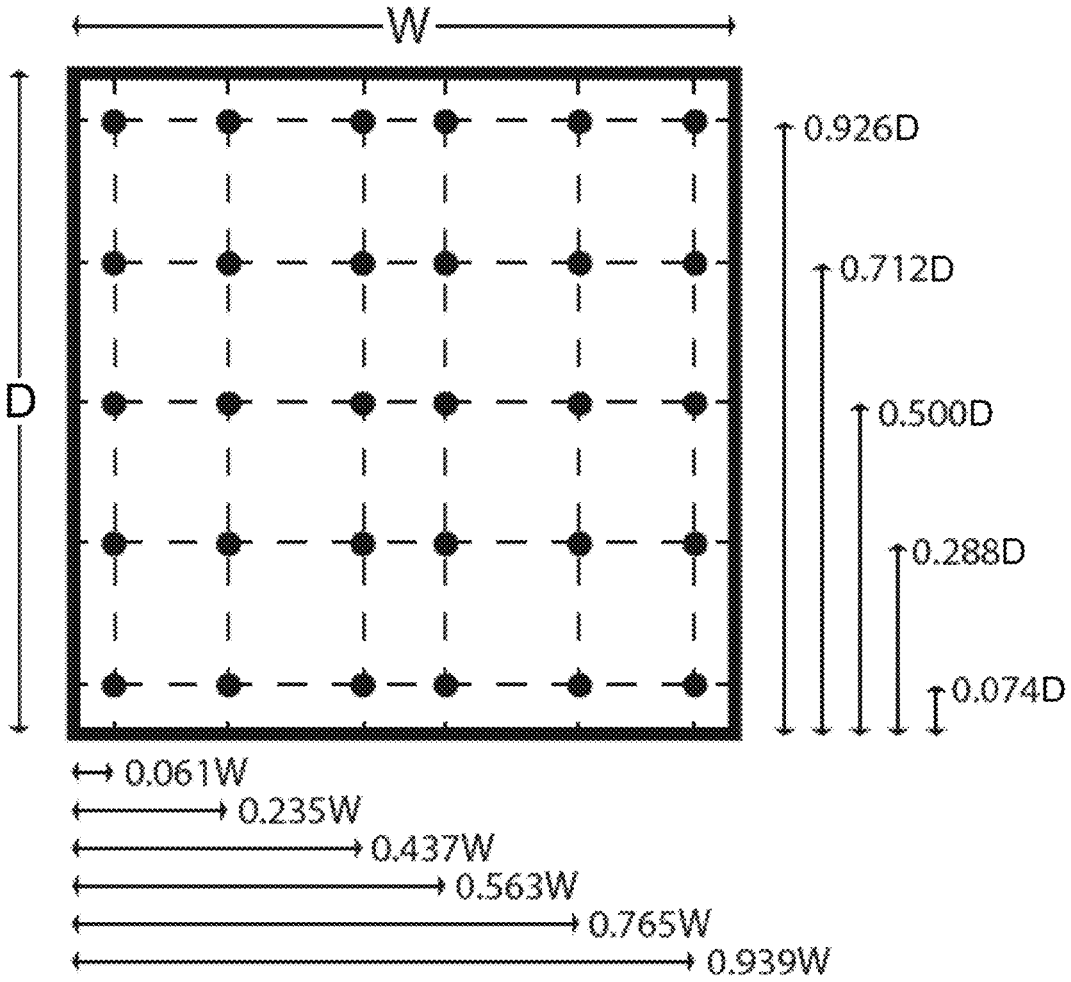
Figure 9 – Prior Art
| Traverse locations using log-Tchebycheff rule in a rectangular duct | | |
|---|---|---|
| Width (W) of Duct | # traverse lines | Depth (D) from Near Wall % of Side Length (W) |
| <30 in. (76 cm) | 5 | 7.4%, 28.8%, 50%, 71.2%, 92.6% |
| 30 to 63 in. (76-160 cm) | 6 | 6.1%, 23.5%, 43.7%, 56.3%, 76.5%, 93.9% |
| >63 in. (160 cm) | 7 | 5.3%, 20.3%, 36.6%, 50%, 63.4%, 79.9%, 94.7% |
Figure 10 – Prior Art

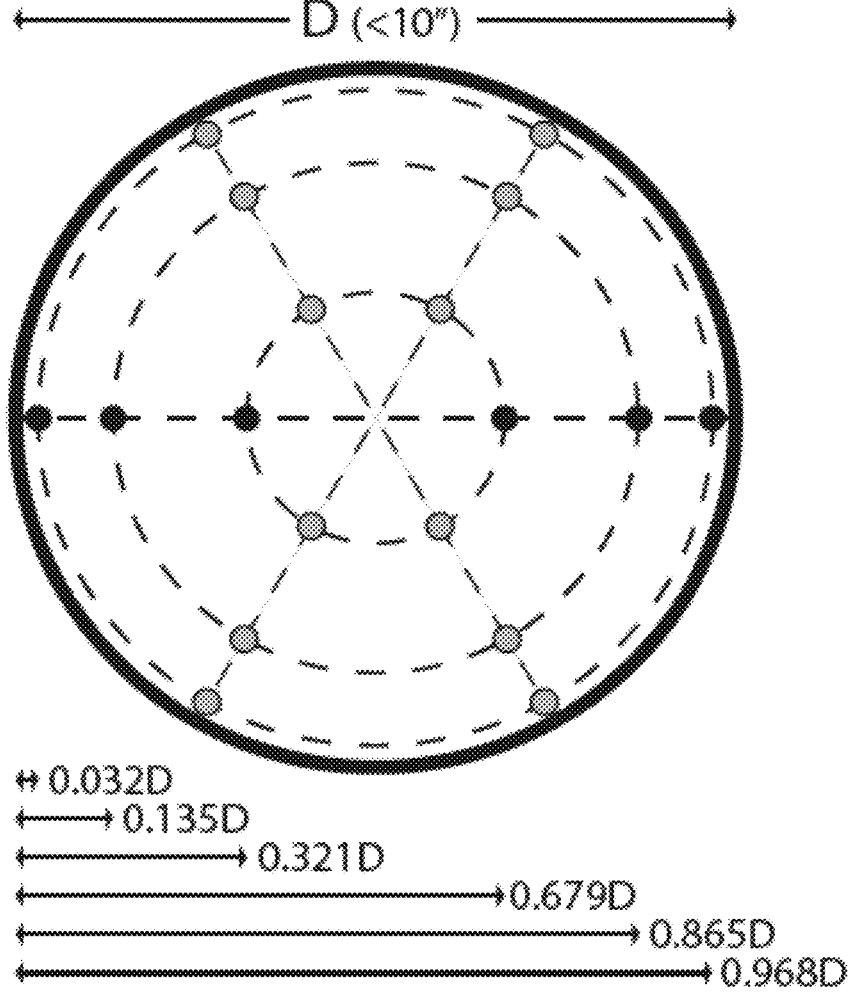
0.032D
0.135D
0.321D
0.679D
0.865D
0.968D
Figure 11 – Prior Art
| Log linear rule for Log-Tchebycheff traverse points on two diameters for a round duct | | |
|---|---|---|
| Diameter | # of points per dia. | Distance from Near wall in % of Diameter (D) |
| <10 in. (25.4 cm) | 6 | 3.2%, 13.5%, 32.1%, 67.9%, 86.5%, 96.8% |
| ≥10 in. (25.4 cm) | 10 | 1.9%, 7.7%, 15.3%, 21.7%, 36.1%, 63.9% |
Figure 12 – Prior Art

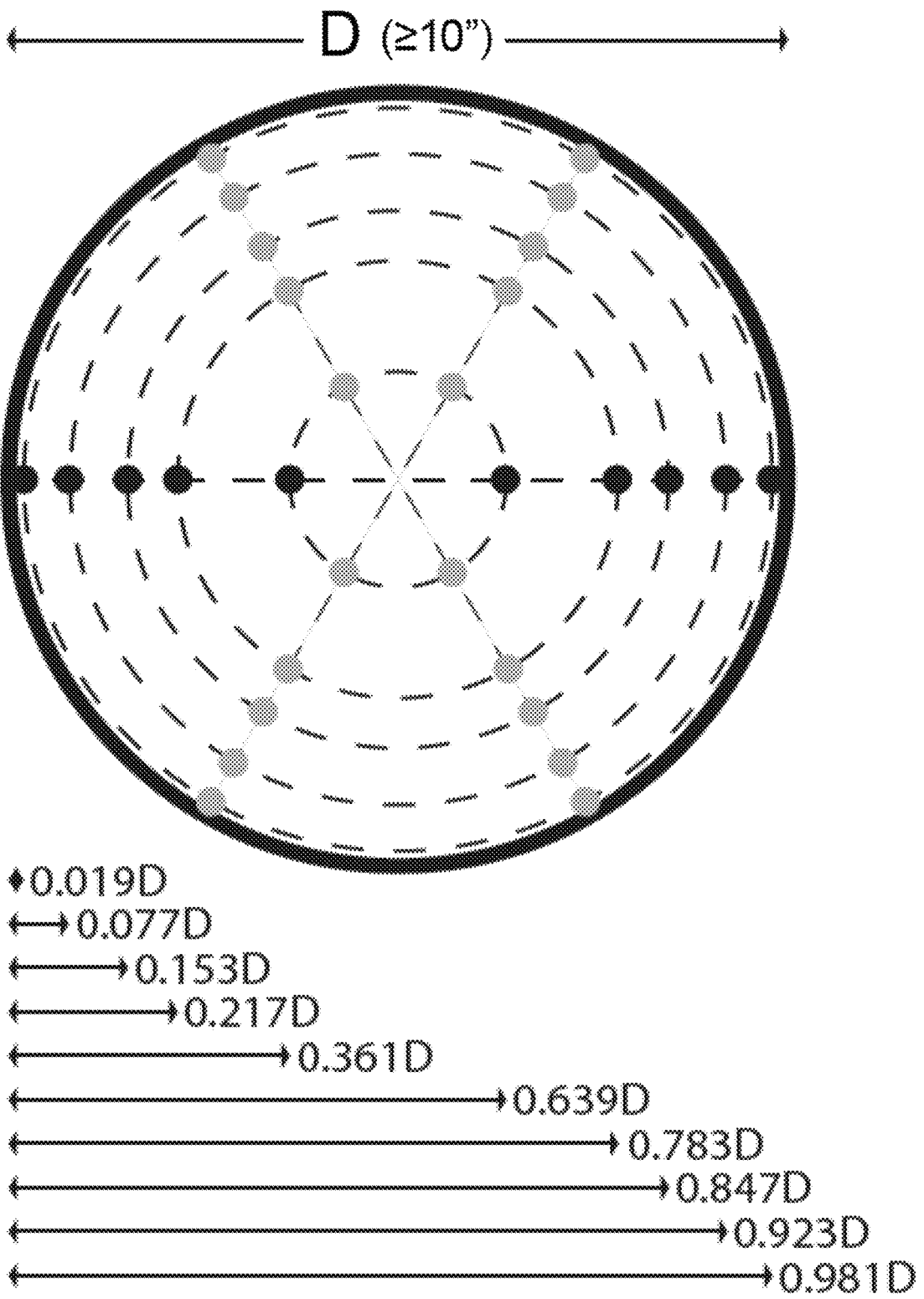
Figure 13 – Prior Art

| Description | Simple Airflow Method (CFM) | Log-Tchebycheff Anemometer Log-T (CFM) | Fan-powered flow hood Duct Blaster (CFM) | Pressure grid TrueFlow (CFM) | Balometer flow capture hood (CFM) |
|---|---|---|---|---|---|
| 5-ton AC | 1538 ± 52 | 1224 ± 53 | 1452 ± 35 | 1509 ± 21 | 1560 ± 78 |
| 5-ton heating | 1213 ± 64 | 986 ± 16 | 1108 ± 12 | 1125 ± 17 | 1140 ± 68 |
| 5-ton fan only | 814 ± 45 | 668 ± 22 | 802 ± 16 | 810 ± 11 | 790 ± 47 |
| 4-ton unit heating | 1158 ± 57 | 924 ± 92 | 1144 ± 16 | 1077 ± 53 | 1071 ± 53 |
| 3-ton AC | 1118 ± 44 | 917 ± 100 | 1288 ± 64 | 1342 ± 80 | 1265 ± 75 |
| 3-ton AC fan only | 628 ± 21 | 565 ± 50 | 654 ± 32 | 638 ± 38 | 680 ± 34 |
| Relative Accuracy | 1.0 ± 0.04 | 0.82 ± 0.05 | 1.0 ± 0.03 | 1.01 ± 0.03 | 1.01 ± 0.06 |

Figure 14

Top View

SIMPLE AIRFLOW MEASUREMENT METHOD FOR HVAC SYSTEMS

REFERENCE TO RELATED APPLICATIONS

This application is a continuation-in-part and claims priority to U.S. Non-Provisional application Ser. No. 19/006, 672, filed Dec. 31, 2024, which is hereby incorporated by reference, to the extent that it is not conflicting with the present application.

TECHNICAL FIELD

This patent specification relates to methods for measuring airflow in for a Heating, Ventilating, Air Conditioning (HVAC) system with or without an economizer connected to the HVAC system.

BACKGROUND

Buildings are cooled and/or heated by Heating, Ventilating, Air Conditioning (HVAC) systems to maintain comfortable conditions for occupants. Low airflow reduces thermal comfort and efficiency and increases operating time and energy use. HVAC system manufacturers require a design airflow across the evaporator or heat exchanger to provide the rated cooling or heating capacity.

Known prior art economizers include an economizer frame that connects to a HVAC system cabinet, a supply and return damper assembly to provide an outdoor airflow ventilation to maintain indoor air quality and provide economizer cooling, and a relief damper assembly to vent excess air from the building to relieve the internal air pressure and balance the supply airflow. The economizer controller uses an actuator to position the economizer supply and return dampers using a coupling mechanism (i.e., gears, levers, rack and pinion, etc.), and sensors to measure air temperature, relative humidity and/or Carbon Dioxide ($CO_2$) concentration in parts per million (ppm). The economizer controls the outdoor airflow, the return airflow and the temperature and humidity of the mixed airflow entering the HVAC system.

Buildings are required to provide a minimum flow of outdoor air into their HVAC systems per the American Society of Heating Refrigeration and Air-Conditioning Engineers (ASHRAE) Standard 62.1 (ANSI/ASHRAE 62.1-2019. Standard Ventilation for Acceptable Indoor Air Quality) and the 2019 California Energy Commission (CEC) Building Energy Efficiency Standards for Residential and Nonresidential Buildings (https://ww2.energy.ca.gov/2018publications/CEC-400-2018-020/CEC-400-2018-020-CMF.pdf). When the outdoor airflow exceeds the minimum required airflow during severe weather (also referred to as the target minimum airflow), the additional airflow may introduce unnecessary hot outdoor air when the HVAC system is cooling the building or introduce unnecessary cold outdoor air when the HVAC system is heating the building. During severe weather, this unnecessary or unintended outdoor airflow reduces space cooling and heating capacity and efficiency and increases cooling and heating energy consumption and the energy costs required to provide space cooling and heating to building occupants.

Known economizer controllers fully open the economizer supply damper and close the return damper to provide a maximum amount of outdoor air to cool the building without using Direct Expansion (DX) refrigerant-based Air Conditioning (AC) during cool weather when the Outdoor Air Temperature (OAT) is cooler than the Conditioned Space Temperature (CST) and the OAT is less than an economizer drybulb setpoint temperature referred to as a High-limit Shut-off Temperature (HST) or the outdoor air enthalpy is less than the enthalpy setpoint. During moderate weather when the OAT is less than the CST, but greater than the HST or the outdoor air enthalpy is greater than the enthalpy setpoint typically 28 British thermal units (Btu) per pound mass (Ibm) of dry air (da) (Btu/Ibm), the economizer damper is set to a minimum outdoor air position and one or more DX AC compressors are used to provide mechanical cooling to the building.

Known methods for measuring the amount of an economizer outdoor airflow introduced into buildings to meet minimum outdoor air ventilation requirements are inaccurate, and better methods are required to reduce cooling and heating energy use and improve indoor air quality, thermal comfort, and energy efficiency. Known techniques for cooling buildings with economizers are inefficient, and more effective methods are needed to reduce cooling energy consumption and enhance thermal comfort and energy efficiency.

Known methods for measuring airflow in Cubic Feet per Minute (CFM) or liters per second (LPS) include a digital hotwire anemometer, a fan-powered flow hood (Duct Blaster), a pressure grid (Trueflow), or a balometer flow capture hood. Known methods for measuring a condenser airflow of an HVAC system use a static pressure, a temperature rise, or a balometer flow capture hood method.

Known hotwire anemometers use heat transfer to determine an air velocity based on a relationship between a voltage output of an anemometer and an air flow velocity or an electrical current to maintain a temperature of a heated wire at a constant value. As the air flows over the wire and cools it down, the anemometer adjusts the electrical current flowing through the hotwire to maintain the temperature. The electrical current is proportional to the air velocity, enabling the air flow rate to be measured. The air velocity times the cross-sectional area of an HVAC plenum or a duct wherein the air is flowing equals the volumetric airflow.

Known hotwire anemometer methods may require three to six or more holes in the HVAC plenum or duct and 30 or more airflow measurements at multiple insertion depths to calculate an average airflow. Depending on the plenum/duct setup, these holes may need to be covered or repaired before returning to standard HVAC operation, which can increase the time associated with performing these known methods of measuring airflow while causing wear and tear on the plenum/duct.

The known hotwire anemometer methods can take 30 to 60 minutes or longer. Furthermore, the known fan-powered flow hood, pressure grid, and balometer flow capture hood methods can also take 30 to 60 minutes or longer and require drilling multiple holes into the plenum or duct.

U.S. Pat. No. 7,891,573 (Finkam '544) discloses a method for controlling airflow into a building and a control algorithm for comparing actual volumetric airflow with measured airflow.

Fieldpiece Inc. published 2011. "In-Duct Hot Wire Anemometer Operator's Manual Model STA2." Date: 2011. Pages: 4. https://resources.fieldpiece.com/wp-content/uploads/2020/12/Opman-STA2v19.pdf. 1636 W Collins Ave, Orange, CA 92867. USA. Fieldpiece manufactures a hotwire anemometer STA2 product and a user manual based on a known log-Tchebycheff (log-T) airflow measurement method with thirty (30) or more traverse measurement points requiring drilling 4 to 6 holes in a rectangular or a circular plenum or duct. This log-T airflow measurement method, shown in FIG. 9 through FIG. 13, shares the deficiencies of the known methods for measuring airflow, including needing a plurality of holes to be drilled into the duct/plenum and being time consuming.

The American National Standards Institute (ANSI) and American Society of Heating, Refrigeration Air Conditioning (ASHRAE) ANSI/ASHRAE Standard 221-2020 ANSI/ASHRAE Standard 221-2020 Test Method to Field-Measure and Score the Cooling and Heating Performance of an Installed Unitary HVAC System measures airflow to evaluate performance.

Known airflow measurement methods require time-consuming and complicated measurements and/or measurement equipment and thus a method for providing simple, fast and accurate methods for measuring airflow is required.

SUMMARY

A simple airflow measurement method is herein disclosed for measuring a Heating, Ventilating, Air Conditioning (HVAC) system airflow for an HVAC system having an air register, wherein a plenum, a duct, or an open-ended box (or a sleeve, hereinafter a "box") is in fluid communication with the HVAC system and configured to be reversibly engaged with the HVAC system. The air register may be supplying the HVAC system airflow from the HVAC system or returning the HVAC system airflow to the HVAC system through a vent or a grill (hereafter referred to as an "air register"). The HVAC system may have a plenum or ducts or may be a mini-split, window, or packaged HVAC system without a plenum or ducts. The HVAC system may have an economizer to provide an outdoor airflow to meet indoor air quality requirements or provide an economizer cooling with only outdoor airflow when the outdoor air temperature or humidity are less than the indoor air temperature or humidity.

In accordance with one aspect, the method may be used to measure an HVAC system airflow across the air register, the plenum, the duct, or the box. In another aspect, the method may be used to measure an economizer outdoor airflow across an economizer outdoor air damper of the HVAC system or the box, wherein the box is in fluid communication with the economizer outdoor air damper and the box is configured to be reversibly engaged with the economizer outdoor air damper. In another aspect, the method may also be used to measure a condenser airflow across a condenser fan outlet or a condenser coil of the HVAC system or the box, wherein the box is in fluid communication with the condenser fan outlet or the condenser coil and the box is configured to be reversibly engaged with the condenser fan outlet or the condenser coil.

In an embodiment, the method uses a hot-wire anemometer sensor inserted into a single hole in a plenum, a duct, or a box wherein the box is reversibly engaged with an economizer outdoor air damper to measure an economizer outdoor airflow or reversibly engaged with a return air register or a supply air register to measure the airflow across the evaporator or the heat exchanger coil. In an embodiment, a register may be a grill such as a flat metal sheet with holes to allow the HVAC system airflow to pass through. In alternative embodiment, the register or grill may be made of wood, plastic or other suitable materials. The hot-wire anemometer sensor measures air velocity or speed of the airflow in feet per minute, feet per second, or meters per second, or other suitable air velocity/speed units. The air velocity times the cross-sectional area of an HVAC plenum or a duct wherein the air is flowing equals the volumetric airflow. The volumetric airflow measurements are reported in Cubic Feet per Minute (CFM), liters per second (LPS), cubic meters per second (CMS) or other volumetric airflow units.

In accordance with one aspect, an airflow measurement method for HVAC system airflow, such as an HVAC airflow through the air register, the economizer outdoor airflow, or the condenser airflow is described using a box temporarily attached to the HVAC system, wherein the box is configured to be in fluid communication with the HVAC system and reversibly engaged with the air register, the economizer, or the condenser. The box may be made of corrugated cardboard, plastic, or other material and the box is temporarily mounted over the air register, the economizer supply inlet, the condenser fan outlet, or the condenser inlet. The hot-wire anemometer sensor is inserted into a single access hole near the center of the box to measure the airflow at three locations comprising a near side of the access hole, a far side of the access hole, and a centerline between the near and the far side of the access hole. The single access hole may be located anywhere in the perimeter of the plenum, the duct, or the box wherein the single hole may be located in a top, a side, a bottom or a corner of the box. The method then calculates the average of the three measurements to calculate an average economizer supply airflow. In another aspect, the method uses a wind shield made of corrugated cardboard, plastic, or other materials positioned on the windward side of the box to reduce a wind-induced pressure on an open inlet side of the box, thereby improving airflow measurement accuracy during windy outdoor conditions.

In another aspect, the method makes more than 50 percent of measurements on the side of the box with the higher airflow and the remaining airflow measurements are made on the opposite side with the lower airflow and averages measurements to calculate the average airflow in the plenum, the duct, or the box.

In accordance with another aspect, an airflow measurement method is described wherein the hot-wire anemometer sensor is inserted into a single access hole near the center of a supply or a return plenum, a duct, or the box to measure the airflow at three locations comprising a near side of the access hole, a far side of the access hole, and a centerline between the near and the far side of the access hole. The method then calculates the average of the three measurements to calculate an average airflow in the plenum, the duct, or the box. In another aspect, the method makes more than 50 percent of measurements on the side of the plenum or duct, or box with the higher airflow and the remaining airflow measurements are made on the opposite side with the lower airflow and averages measurements to calculate the average airflow in the plenum, the duct, or the box.

BRIEF DESCRIPTION OF DRAWINGS

The above and other aspects, features and advantages will be more apparent from the following brief description of the drawings.

FIG. 9 shows a prior art schematic diagram of known log-Tchebycheff (log-T) method with thirty (30) or more traverse measurement points in a rectangular duct to insert a hot-wire anemometer to measure HVAC airflow.

FIG. 10 shows a prior art table of traverse locations for the rectangular duct of FIG. 9 for a known log-T method for less than (<) 30 inches, 30 to 63 inches, and greater than 63 inches.

FIG. 11 shows a prior art schematic diagram of known log-T method with thirty (30) or more traverse measurement points in a circular duct less than 10 inches diameter to insert a hot-wire anemometer to measure HVAC airflow.

FIG. 12 shows a prior art table of traverse locations for the circular duct of FIG. 11 for a known log-T method for less than (<) 10 inches and greater than or equal to (≥) 10 inches.

FIG. 13 shows a prior art schematic diagram of known log-T airflow measurement method with thirty (30) or more traverse measurement points in a circular duct ≥10 inches diameter to insert a hot-wire anemometer to measure HVAC airflow.

FIG. 14 provides a summary of airflow measurements (in CFM) comparing the accuracy of the disclosed simple airflow measurement method to the more complicated log-T, fan-powered flow hood (Duct Blaster), pressure grid (Trueflow), or balometer flow capture hood methods.

Corresponding reference characters indicate corresponding components throughout several views of the drawings.

DETAILED DESCRIPTION

The following description is of the mode presently contemplated for implementing the airflow measurement method to measure airflow in Cubic Feet per Minute (CFM), or other suitable units, for a Heating, Ventilating, Air Conditioning (HVAC) system. The Système international d'unités (SI) for airflow are liters per second (LPS) and 1 CFM equals roughly 0.47194745 LPS. As is understood, the airflow units of measurement are a volumetric airflow rate.

Where the terms "about" or "generally" are associated with an element of the description, it is intended to describe a feature's appearance to the human eye or human perception, and not a precise measurement, for example within plus or minus 5%.

The simple airflow measurement method is described using flow charts, equations, and calculations. The equations and calculations can be implemented on a computer, mobile, or web-based software application including, but not limited to Microsoft Excel, Apple Numbers, Google Sheets, or Wordperfect Office Suite Quatro Pro. The logic equations or functions can be implemented in programming languages such as Swift, Android, Visual Basic, C++, Python, Java, TypeScript, Python, C#, Ruby, PHP, or other language.

Figure 1:
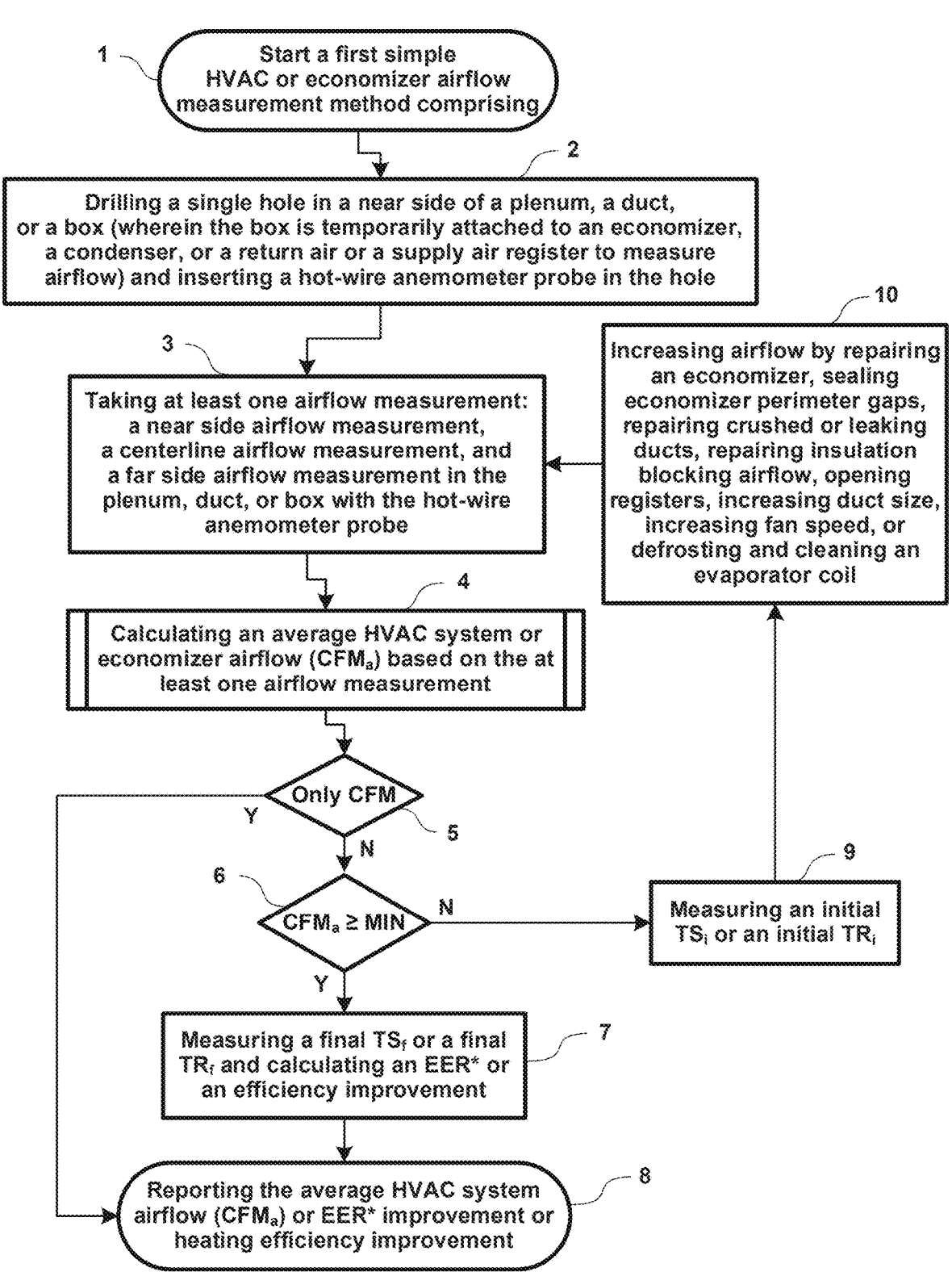
FIG. 1 provides a flow chart of a first simple airflow measurement method to measure a Heating, Ventilating, Air Conditioning, (HVAC) system airflow across an evaporator in Cubic Feet per Minute (CFM) or other volumetric airflow rate units.

FIG. 1 provides a flow chart of a first simple airflow measurement method to measure an HVAC system airflow across an evaporator or heat exchanger coil. The HVAC system transfers heat through a continuous cycle, where the HVAC system airflow enters through a return air register or a vent, moves through an air filter and an evaporator or a heat exchanger coil, a plenum or a duct, and leaves through supply registers or vents, distributing heated or cooled air throughout a conditioned space. The HVAC system rejects heat with a condenser airflow across a condenser coil. The economizer of an HVAC system controls an economizer outdoor airflow to maintain an indoor air quality or cool the building with a lower temperature economizer outdoor airflow. In an embodiment, the evaporator coil and/or the heat exchanger are disposed within the HVAC system and configured to change a temperature of the HVAC system airflow through the HVAC system.

At step 1 of FIG. 1, the first simple airflow measurement method ("first airflow measurement method") for the HVAC system, the economizer, or the condenser starts, before proceeding to step 2. At step 2, the method comprises drilling a single access hole 101 in a supply or return plenum or a supply or return duct (see FIG. 5) or a single access hole 49 in a box 41 or sleeve open on each end herein referred to as a "box" (see FIG. 3). In an embodiment, the box 41 is temporarily attached or otherwise reversibly engaged to the HVAC system, a wall 46, a ceiling, or a door surrounding at least one airflow element of the HVAC system, the at least one airflow element of the HVAC system being selected from the group consisting of: an air register, a vent, a grill, a plenum, a duct, an economizer outdoor air damper, a condenser coil inlet, a condenser fan outlet, or a box temporarily attached to the HVAC system, wherein the box is configured to be in fluid communication with the HVAC system and reversibly engaged with the HVAC system (see FIG. 3). In another embodiment, the box is temporarily attached or otherwise reversibly engaged to an economizer outdoor air damper (see FIG. 4 or FIG. 17) or a condenser fan outlet or a condenser coil inlet (see FIG. 20). In said embodiment, the box is temporarily attached to said structure with a masking tape 48, other tape, magnets, hook and loop, or other means. In an embodiment, an anemometer sensor 142 is inserted into a single access hole 125 of a near side 131 (see FIG. 6) of a plenum or a duct of a supply plenum 105 (see FIG. 5), or a box 41 (see FIG. 3). In an embodiment, the hot-wire anemometer sensor measures air velocity or speed of the airflow in feet per minute, feet per second, or meters per second. The air velocity times the cross-sectional area of an HVAC plenum or a duct wherein the air is flowing equals the volumetric airflow. Known methods require drilling multiple holes and taking significantly more measurements, which can take 30 to 60 minutes or more without improving accuracy over the method of measuring an HVAC system airflow disclosed herein. The herein disclosed airflow measurement method may only take 5 to 15 minutes and may only drill a single access hole in the plenum, the duct, or the box, which causes less damage to the plenum, duct, or box, respectively. Measuring at least one HVAC system airflow with a reusable box is non-invasive and avoids any damage. Furthermore, using the box to measure airflow, wherein the box is temporarily attached/reversibly engaged with masking tape or other method to a wall, a ceiling, or a door surrounding a return air or a supply air register, is less intrusive, and causes less damage to the plenum or the duct. The single access hole may be located anywhere in the perimeter of the plenum, the duct, or the box comprising a top, a side, a bottom or any corner. Step 2 also comprises inserting the hot-wire anemometer sensor through the single access hole in the near side of the plenum, the duct, or the box. It should be understood that the near side is the side nearest to the single access hole.

As seen in FIG. 1, after step 2, the method may proceed to step 3. Step 3 of FIG. 1 describes performing at least one action selected from the group consisting of: measuring and recording a near side airflow 127 (see FIG. 6) at a near side location, measuring and recording a depth centerline airflow 133 (see FIG. 6) at a depth centerline location and measuring and recording a far side airflow 135 (see FIG. 6) at a far side location. In an embodiment, the depth centerline location may be disposed anywhere between the near side and the far side of the plenum, the duct, or the box.

As seen in FIG. 1, after step 3, the method may proceed to step 4. Step 4 of FIG. 1 describes calculating an average HVAC system airflow based (such as average economizer airflow) on the at least one airflow measurement. In one embodiment, the average HVAC system airflow may be calculated based on the at least one airflow measurement selected from the group consisting of: the near side airflow 127 (a near side airflow measurement), the depth centerline airflow 133 (a depth centerline airflow measurement), and the far side airflow 135 (a far side airflow measurement) (See FIG. 6). In another embodiment, the average HVAC system airflow may be calculated based on the average of the near side airflow 127, the depth centerline airflow 133, and the far side airflow 135 (see FIG. 6). Following step 4, the method goes to Step 5. At step 5, if only measuring airflow (CFM) is Yes (Y), (e.g., a user of the method only wants to measure airflow, not efficiency), the method goes to step 8. Step 8 comprises reporting the average HVAC system airflow (CFM$_a$). If step 5 is No (N), the method goes to an optional step 6 to evaluate whether the average HVAC system airflow is greater than or equal to a minimum airflow (CFM$_a \geq$ MIN). If optional step 6 is No (N) (e.g., CFM$_a <$ MIN, the HVAC system airflow (CFM$_a$) is less than a minimum HVAC system airflow (MIN)), the method proceeds to an optional step 9 to measure an initial temperature split (TS$_i$) across an evaporator coil for a cooling mode, which is equal to a return air drybulb temperature minus a supply air drybulb temperature in degrees Fahrenheit (° F.). In an alternative embodiment, the method proceeds to an optional step 9 to measure an initial heating temperature rise (TR$_i$) across a heat exchanger for a heating mode, which is equal to an initial supply air drybulb temperature minus an initial return air drybulb temperature (° F.). The heating mode or the cooling mode may be based on the operation of a heat exchanger (heating mode) or an evaporator coil (cooling mode) within the HVAC system. After Step 9, the method proceeds to an optional Step 10 to increase airflow in the duct/plenum. The method to increase the airflow may comprise repairing an economizer, sealing an economizer perimeter gap, repairing crushed or leaking ducts, repairing insulation that is blocking the airflow, opening registers, increasing duct size (diameter or cross-sectional area to reduce a static pressure), increasing fan speed, and/or defrosting and cleaning an evaporator coil. Increasing fan speed may comprise connecting the high-speed wire from the fan motor to the cooling speed connector (terminal or connector) or speed control taps or switches. After optional Step 10, the method may return to Step 3 to calculate a final average HVAC system airflow (CFM$_a$).

When step 6 is Yes (Y) (e.g., CFM$_a \geq$ MIN, the HVAC system airflow (CFM$_a$) is greater than or equal to a minimum HVAC system airflow (MIN)), the method goes to optional Step 7. At step 7, the method measures a final temperature split (TS$_f$) across the evaporator coil in cooling mode based on a final return air drybulb temperature minus a final supply air drybulb temperature (° F.). The method calculates an energy efficiency ratio (EER*) improvement, such as a cooling efficiency improvement, based on measurements of an initial average HVAC system airflow (CFM$_{ai}$) and an initial temperature split (TS$_i$) across the evaporator coil and a final average HVAC system airflow (CFM$_{af}$) and a final temperature split (TS$_f$) across the evaporator coil per the following equation shown in Eq. 1.

$$EER * \text{Improvement} = C * \left[ 1 - \frac{CFM_{a_i} * TS_i}{CFM_{a_f} - TS_f} \right] \qquad \text{Eq. 1}$$

Where:

C=a coefficient based on laboratory tests between 0 and 1 preferably 0.86 (dimensionless), $CFM_{a_i}$=Initial average HVAC system airflow before the airflow repairs, $TS_i$=Initial Temperature split in cooling mode before airflow repairs, wherein $TS_i$ is equal to the initial return air drybulb temperature minus the initial supply air drybulb temperature in ° F., $CFM_{a_f}$=Final average HVAC system airflow after the airflow repairs, and $TS_f$=Final Temperature split in cooling mode after airflow repairs, wherein $TS_f$ is equal to the final return air drybulb temperature minus the final supply air drybulb temperature in ° F.

Alternatively, the method may be used in a heating mode to calculate a heating efficiency improvement shown in Eq. 2. The heat efficiency improvement is based on the final temperature rise ($TR_f$) across the heat exchanger which is equal to a final supply air drybulb temperature minus a final return air drybulb temperature (° F.), and initial temperature rise ($TR_i$) across the heat exchanger, which is equal to an initial supply air drybulb temperature minus an initial return air drybulb temperature (° F.).

$$\text{Heating efficiceny Improvement} = C * \left[ 1 - \frac{CFM_{a_i} * TR_i}{CFM_{a_f} * TR_f} \right] \quad \text{Eq. 2}$$

Where:

C=a coefficient based on laboratory tests between 0 and 1 preferably 0.86 (dimensionless), $CFM_{a_i}$=Initial average HVAC system airflow before the airflow repairs, $TR_i$=Initial Temperature rise in heating mode before airflow repairs, wherein TR, is equal to the initial supply air drybulb temperature minus the initial return air drybulb temperature in ° F., $CFM_{a_f}$=Final average HVAC system airflow after the airflow repairs, and $TR_f$=Final Temperature rise in heating mode after airflow repairs, wherein TR? is equal to the final supply air drybulb temperature minus the final return air drybulb temperature in ° F.

From step 7, the method may proceed to step 8 and report the average HVAC system airflow measurement in volumetric airflow rate units (CFM, LPS, CMS, or other appropriate units) or the cooling efficiency improvement (the EER* improvement) or the heating efficiency improvement. It should be noted that both the cooling efficiency improvement and the heating efficiency improvement may be referred to as "efficiency improvements".

Figure 2:
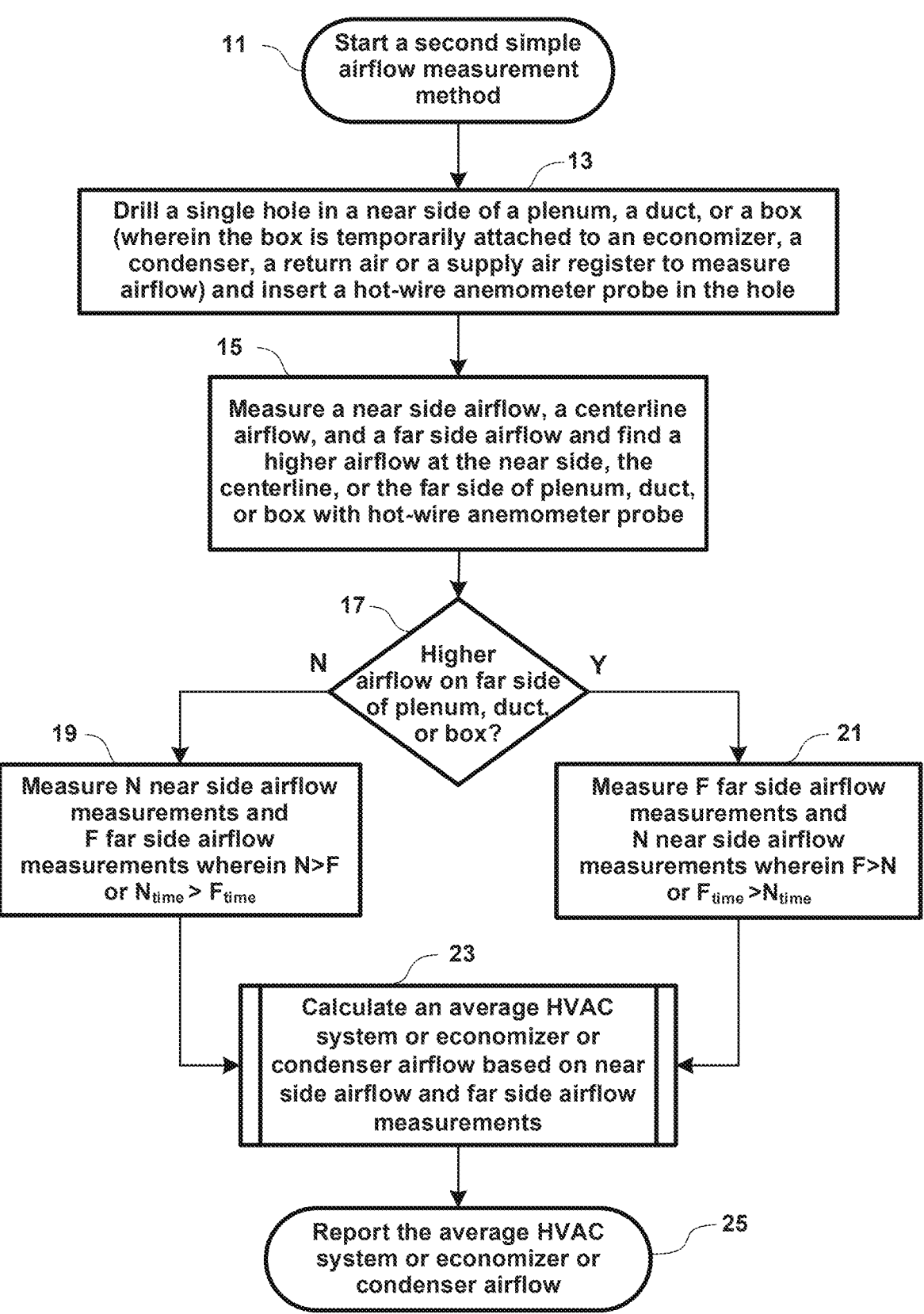
FIG. 2 provides a flow chart of a second simple airflow measurement method to measure the HVAC system airflow across an evaporator in CFM or other units.
Figure 20:
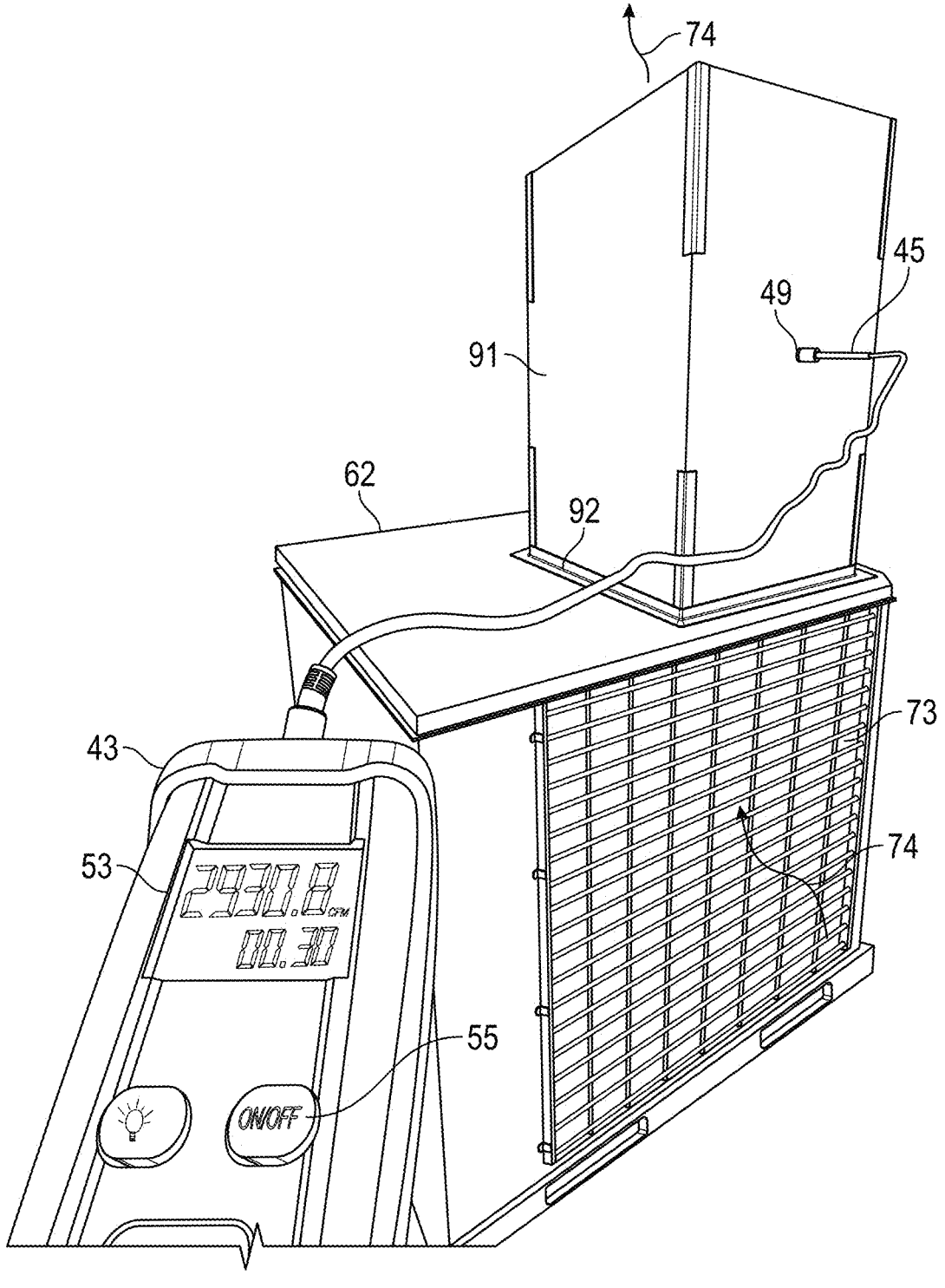
FIG. 20 shows a side view of an HVAC system with a box temporarily attached with masking tape or other attachment method to the top of the HVAC system surrounding the condenser fan outlet, wherein the box has a single access hole to insert an anemometer probe to measure a condenser airflow with an anemometer.

FIG. 2 provides a flow chart of a second simple airflow method to measure an HVAC system airflow across an evaporator, a heat exchanger coil, an economizer outdoor air damper (see FIG. 4 or FIG. 17) or a condenser (see FIG. 20). At step 11, the second simple airflow measurement method ("second airflow measurement method") starts, before proceeding to step 13. At step 13, the method drills a single access hole 101 in a supply or return plenum or a supply or return duct (see FIG. 5) or drills a single access hole 49 in a box 41 (see FIG. 3). In an embodiment, the box 41 is temporarily attached to a wall, a ceiling, or a door surrounding a return air register or a supply air register as described above (see FIG. 3). Furthermore, for step 13, the anemometer sensor 142 is inserted into a single access hole 125 of a near side 131 (see FIG. 6) of a plenum, a single access hole 101 of a duct of a supply plenum 105 (see FIG. 5), or single access hole 49 a box 41 (see FIG. 3).

Figure 6:
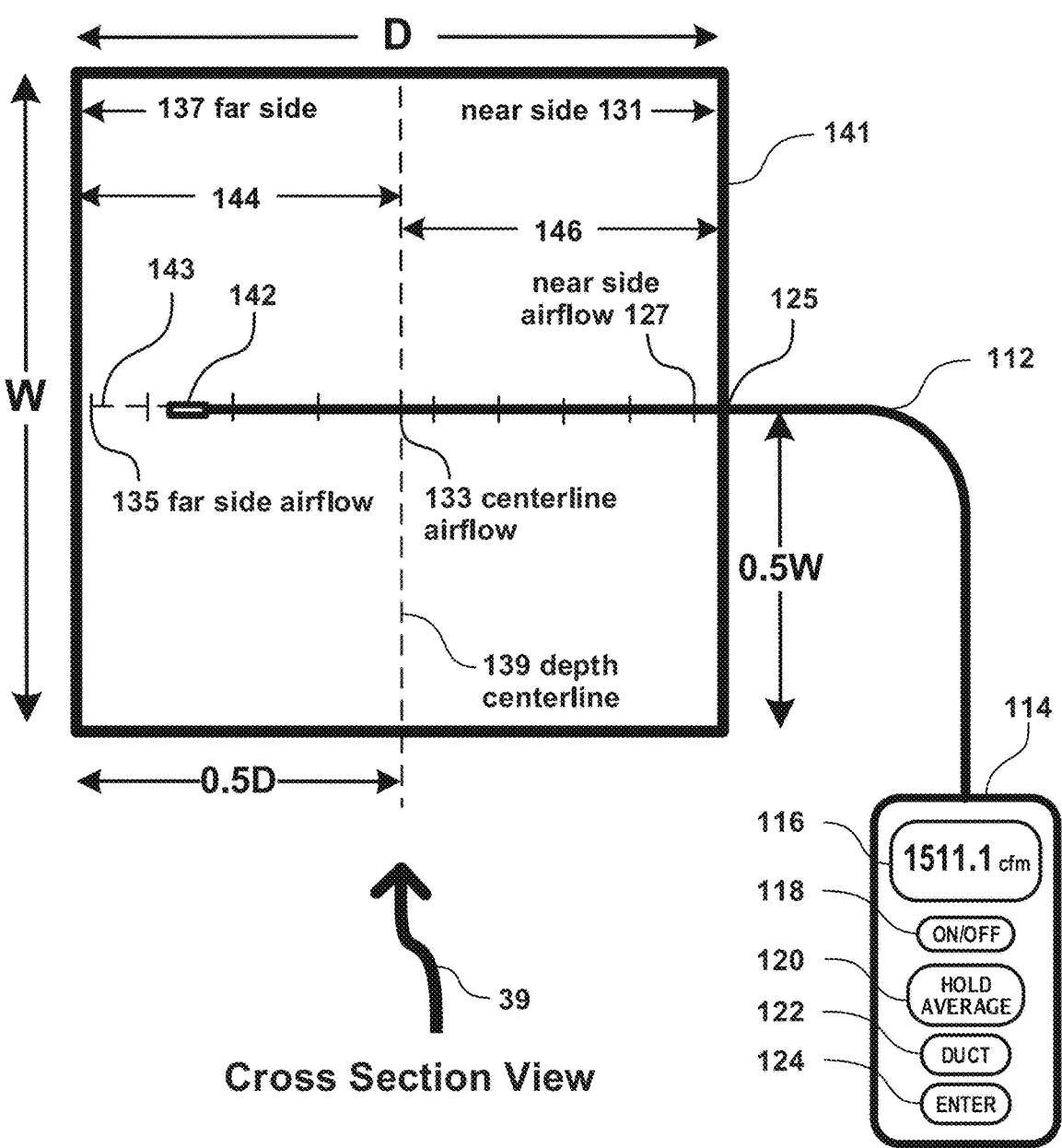
FIG. 6 shows a schematic diagram of the simple airflow method showing the anemometer probe inserted into a single access hole to measure the HVAC airflow.

Following step 13 of FIG. 2, Step 15 describes measuring and recording an airflow value of the near side airflow 127 at the near side 131, a depth centerline airflow 133 at the depth centerline 139 (i.e., "centerline"), and a far side airflow 135 at a far side 137 (see FIG. 6) of the plenum, the duct, or the box using the anemometer sensor 142 (see FIG. 6). As noted above, the depth centerline location may be disposed anywhere between the near side and the far side of the plenum, the duct or the box (See FIG. 6). In other words, in an embodiment, the depth centerline location may be located anywhere along the depth centerline (e.g., at different width locations). Following step 15, Step 17 checks which side of the corresponding structure (e.g., the plenum, duct, or box) has higher airflow. If Step 17 determines the far side has the higher airflow than the near side, then the method proceeds to step 21. At step 21, the method measures "F" far side airflow measurements and "N" near side airflow measurements wherein F>N (entered values). Similarly, in an embodiment, the method measures airflow for a longer time duration on the far side than the near side, wherein the $F_{time}$ is greater than $N_{time}$. It should be understood that the variable "F" may be used to represent the quantity of airflow measurements taken on the F far side 144 (see FIG. 6) of the corresponding structure, whereas the variable "N" may be used to represent the quantity of airflow measurements taken on the N near side 146 (see FIG. 6) of the corresponding structure. Similarly, the variable "$F_{time}$" may be used to represent the duration of time spent measuring airflow in the far side of a structure, whereas the variable "$N_{time}$" may be used to represent the duration of time spent measuring the airflow in the near side of the structure.

If Step 17 of FIG. 2 determines the near side has higher airflow than the far side, then the method proceeds to step 19. At Step 19 the method measures N near side airflow measurements and F far side airflow measurements wherein N>F (entered values) or measures airflow for a longer time duration on the near side than the far side wherein the $N_{time}$ is greater than the $F_{time}$. As is understood, higher airflow may occur on the near side 131, the depth centerline 139, or the far side 137 (see FIG. 6) depending on location and positioning of a blower fan outlet, branch ducts, or duct designs with respect to the plenum or duct or the air filter (not shown).

In an embodiment, the second simple airflow measurement method determines which side of the centerline of the plenum, the duct, or the box provides higher airflow values. The higher airflow might alternatively be at the centerline, so the method also compares to the depth centerline airflow value to the near side and far side values. In an embodiment, wherein airflow at the centerline of the plenum/duct is higher than airflow at the corresponding near side or far side, more than 50% of airflow measurements may be taken at the centerline of the plenum or duct, with the remainder of the airflow measurements taken at either side of the centerline. As such, when airflow is highest at the depth centerline, the depth centerline airflow may be referred to as the "higher airflow side" whereas the near and far sides may be referred to as lower airflow sides. In an embodiment, the second simple airflow measurement method of FIG. 2 measures more than 50% of the airflow values on the higher airflow side and measures less than 50% of airflow values (measurements) on the lower airflow side(s). The second method calculates the average HVAC system airflow based on a sum of the measured airflow values divided by a total number of measured airflow values. Following step 19 or 21, step 23 of FIG. 2 calculates the average HVAC system airflow based on the N near side airflow measurements and F far side airflow measurements. In an alternative embodiment, wherein airflow values are highest at the centerline, in addition to the N near side airflow measurements and the F far side airflow measurements, the airflow measurements may include C centerline airflow measurements ("C depth centerline airflow measurements"), wherein C is the quantity of airflow measurements taken at the depth centerline 139 between the near side and the far side (see FIG. 6). The embodiment may comprise measuring N airflow measurements at the near side location, C airflow measurements at the depth centerline location, and F airflow measurements at the far side location, wherein the airflow measurements are measured on a higher airflow side over a longer duration than the airflow measurements measured on a lower airflow side. Similarly, for time duration-based embodiments of the simple airflow measurement method, in addition to the N$_{time}$ and F$_{time}$ measurements, the time duration measurements may include C$_{time}$ (the duration of time spent measuring airflow at the depth centerline of a structure.) After step 23, the second simple airflow measurement method concludes with step 25 wherein the method reports the calculated average airflow measurement.

Figure 3:
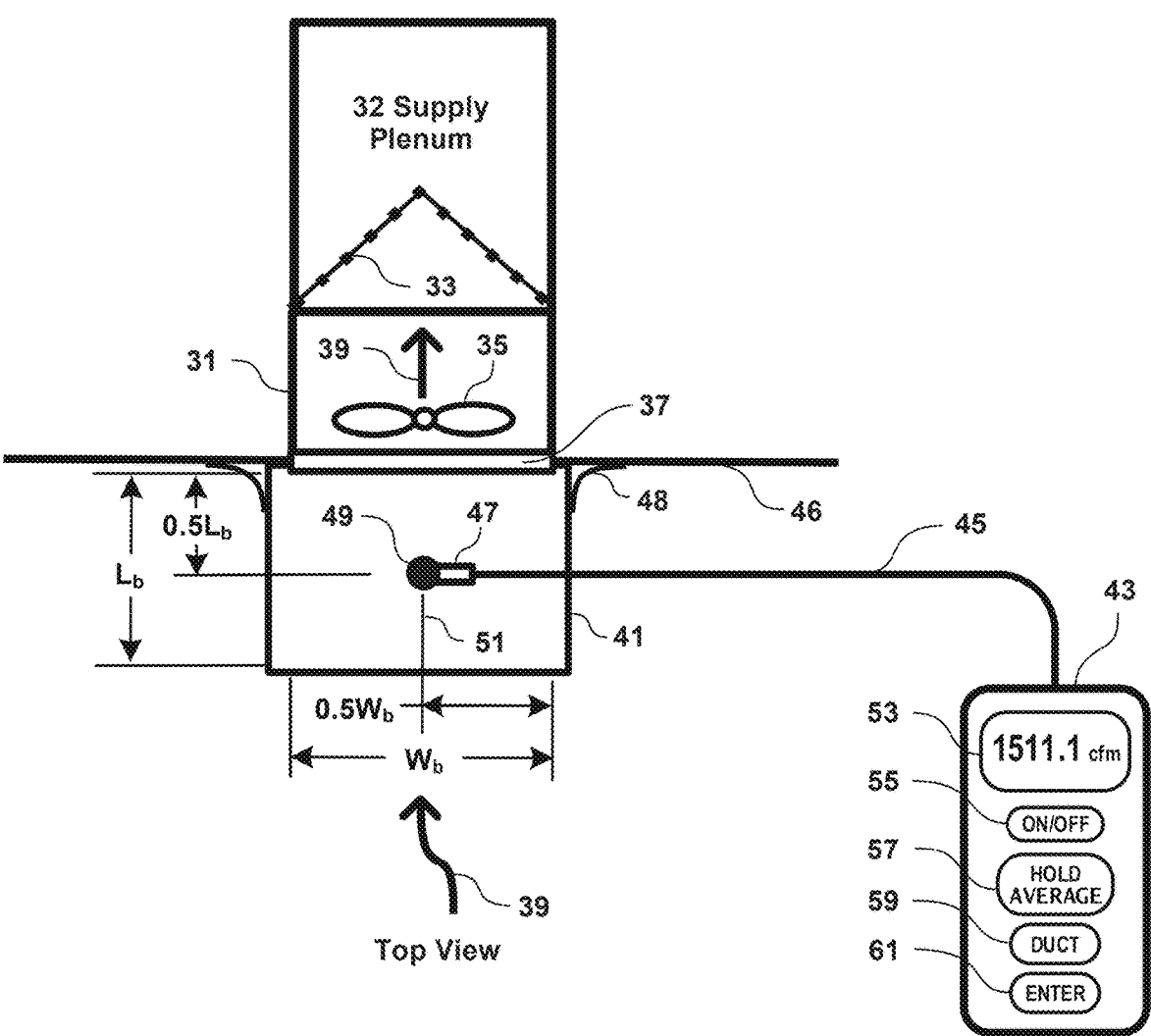
FIG. 3 shows a schematic diagram of an HVAC system without a return plenum with a box temporarily attached with masking tape or other attachment method to a wall, a ceiling, or a door surrounding a return or a supply air register, wherein the box has a single access hole to insert an anemometer probe to measure an HVAC airflow.

FIG. 3 shows a top view schematic diagram of an HVAC system showing a Forced Air Unit ("FAU") 31 containing an HVAC fan 35 which produces an average HVAC system airflow 39 across an evaporator coil 33 or a heat exchanger coil. In the embodiment, the FAU 31 is located in a closet, a ceiling, or a cabinet. In said embodiment, the FAU 31 has a supply plenum 32 and a return air register 37 (or a "return air grill"), but does not have a return plenum. In an embodiment, a box 41 which is an open-ended box (or a sleeve hereinafter a "box") is temporarily attached to the return air register 37 or a wall 46 to measure the average HVAC system airflow 39. The HVAC system airflow is measured in cubic feet per minute (CFM), liters per second (LPS), cubic meters per second (CMS), or other volumetric airflow rate units. The box 41 may be made of corrugated cardboard or other lightweight materials (e.g., plastic, fabric, etc.). In an embodiment, the box 41 has a single access hole 49 located on one side of the box 41 at approximately 0.5 times a width Wb and 0.5 times Length L$_b$ (e.g., at the width centerline 51 of the corresponding side of the box 41, as shown in FIG. 3). The depth of the box (not shown) is generally equal to or longer than the width W, and the cross sectional area of the box 41 is larger than the cross sectional area of the return grill 37. The box 41 may be secured with masking tape 48 to a wall 46, a ceiling, or a door surrounding the return grill 37 as described above. The box 41 overlaps with the return grill 37 to capture airflow through the return grill 37. The single access hole 49 may be larger or smaller than $\frac{5}{16}$-inch diameter and within +/−6 inches of the width centerline 51 of the box 41. The box 41 may also be configured to overlap with a supply grill ("supply air register").

FIG. 3 shows an anemometer 43 and an anemometer sensor 47 inserted in the single access hole 49 in the box 41 to measure the HVAC airflow 39 across an evaporator coil 33. The anemometer 43 may be in electrical communication with the anemometer sensor 47 through the anemometer probe 45, such that anemometer 43 is configured to receive the corresponding signals from the anemometer sensor 47 to measure airflow rates at the position of the anemometer sensor 47. The single access hole 49 may be located near a centerline 51 of the box 41. FIG. 3 shows an anemometer 43 with a display 53 (showing a 1511.1 CFM average measurement), an on/off button 55, a hold/average button 57, a duct button 59 to enter a duct type (rectangular or circular) and dimensions (height×width or diameter), and an enter button 61 to capture an airflow value or average airflow values over a time function. For the time function, the airflow may be averaged or based on a first airflow measurement at a near side (to the single access hole 49), a second airflow measurement at a centerline (half way across a depth of the box 41), and a third airflow measurement at a far side (away from the single access hole 49). In an embodiment, the total time to measure airflow using the simple airflow method is less than 5 minutes including drilling a single $\frac{5}{16}$-inch diameter hole in the plenum, the duct, or the box 41. As described hereinabove, the centerline location may be disposed anywhere between the near side and the far side of the box.

Figure 4:
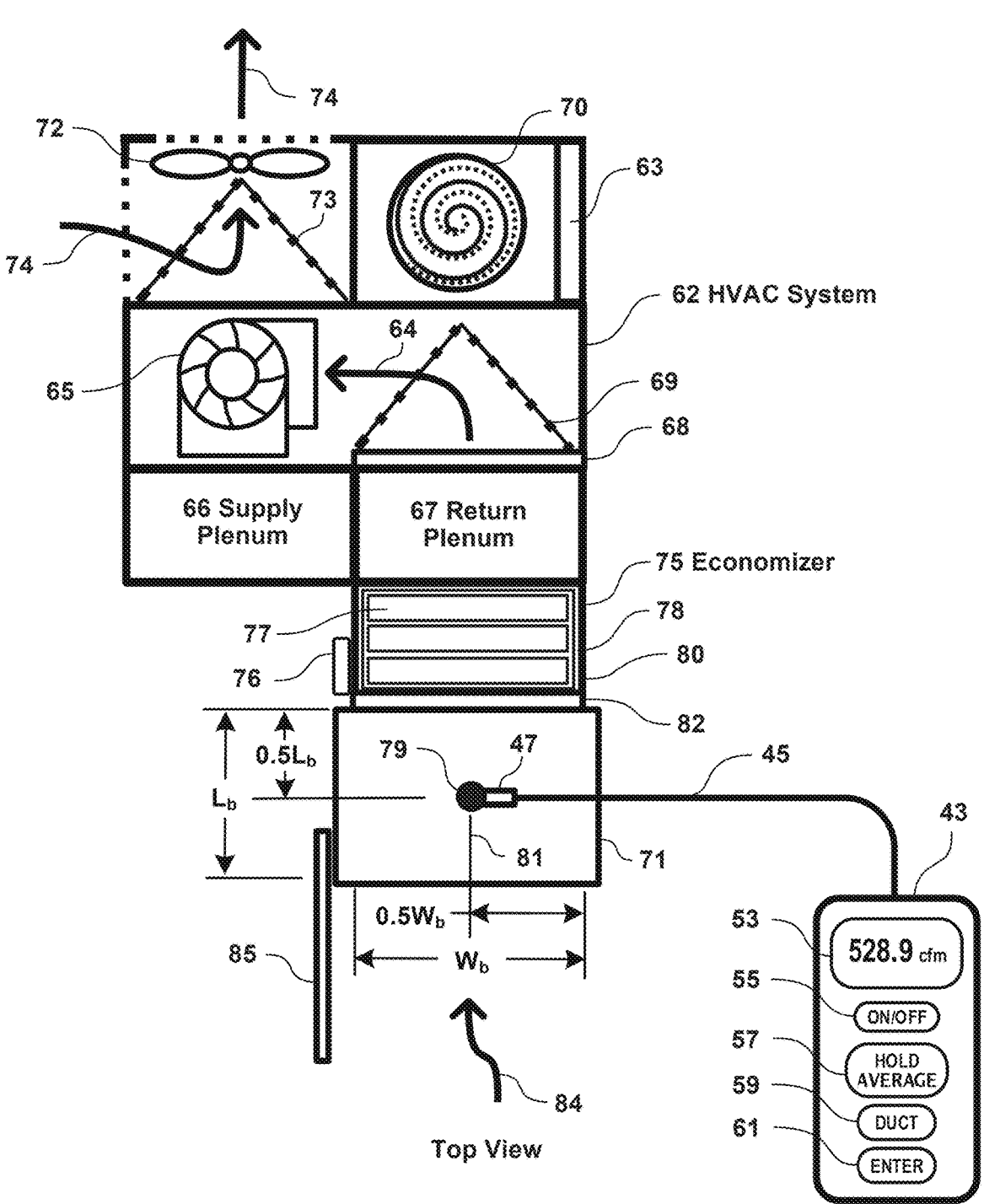
FIG. 4 shows a schematic diagram of an HVAC system with an outdoor air economizer (hereafter "economizer") with a box temporarily attached with masking tape or other attachment method over the economizer hood that covers the outdoor air damper assembly that supplies outdoor air to the HVAC system and the building. The box has a single access hole to insert an anemometer probe to measure an economizer outdoor airflow.

FIG. 4 shows a top-view schematic diagram of an HVAC system 62 having an economizer 75. The HVAC system 62 includes a supply plenum 66, a return plenum 67, an air filter 68, and an HVAC fan 65, which produces an average HVAC system airflow 64 across an evaporator coil 69 or a heat exchanger coil (not shown). FIG. 4 also shows a control panel 63 of the HVAC system 62, a compressor 70, a condenser coil inlet 73, a condenser fan 72, and a condenser airflow 74. The economizer 75 features an economizer outdoor air damper ("outdoor air damper") 82 and a supply and return damper assembly 77, supported by an economizer frame 78. The economizer 75 controls an economizer outdoor airflow 84 entering the HVAC system 62 through the outdoor air damper 82 by closing or opening the supply and return damper assembly 77. The economizer frame 78 has an economizer perimeter gap 80 (such as the perimeter gap 80 shown in FIG. 18) that allows an uncontrolled outdoor airflow to enter the HVAC system. The economizer 75 also includes an economizer controller 76 and an actuator, temperature sensors, humidity sensors, and carbon dioxide sensors (not shown) that control the position of the supply and return dampers to maintain a return airflow and an outdoor airflow, thereby meeting minimum outdoor air ventilation requirements and providing economizer cooling. Economizer cooling is enabled when the outdoor air temperature (OAT) is cooler than the conditioned space temperature (CST), and the OAT is less than the economizer drybulb setpoint temperature, referred to as the High-Limit Shut-off Temperature (HST), or the outdoor air enthalpy is less than the enthalpy setpoint. During moderate weather, when the OAT is less than the CST but greater than the HST or the outdoor air enthalpy is greater than the enthalpy setpoint, typically 28 British thermal units (Btu) per pound-mass (Ibm) of dry air (da) (Btu/lbm), the outdoor air damper at a minimum outdoor air position and one or more Direct Expansion (DX) air conditioner (AC) compressors provide mechanical cooling to the building.

In the embodiment, the HVAC system 62 is located on a rooftop or next to a building. In an embodiment, a box 71 or sleeve which is open on each end herein referred to as a "box." The box 71 is temporarily attached to the outdoor air damper 80 over the economizer hood (not shown) with masking tape or other attachment method to cover the outdoor air damper 80 that supplies outdoor air to the HVAC system and the building. The box 71 has a single access hole to insert an anemometer probe 45 to measure an economizer outdoor airflow. The box 71 is temporarily attached to the economizer 75 outdoor air damper 80 to measure the average economizer outdoor airflow 84, which is measured in CFM, LPS, CMS, or other volumetric airflow rate units. The box 71 may be referred to as a "hood" constructed of corrugated cardboard, plastic, metal, fabric, or another suitable lightweight material. In an embodiment, the box 71 has a single access hole 79 located on one side of the box 71 at approximately 0.5 times a width Wb and 0.5 times Length L$_b$ (e.g., at the width centerline 81 of the corresponding side of the box 71, as shown in FIG. 4). The depth of the box (not shown) is generally equal to or longer than the width Wb and the cross-sectional area of the box 71 is larger than the cross-sectional area of the outdoor air damper 76. The box 71 may be secured with masking tape surrounding the outdoor air damper 80 as described above. The box 71 overlaps with the outdoor air damper 80 to capture airflow through the outdoor air damper 80. The single access hole 79 may be larger or smaller than 5/16-inch diameter and located within +/−6 inches of the width centerline 81 of the box 71. FIG. 4 shows a wind shield 85 on the left side or windward side of the box 71 to reduce a wind-induced pressure on an open inlet side of the box, thereby improving an airflow measurement accuracy during windy outdoor conditions. In an embodiment, the wind shield 85 can be made of corrugated cardboard, plastic, metal, wood, or other suitable materials.

FIG. 4 shows an anemometer 43 and an anemometer sensor 47 inserted in the single access hole 79 in the box 71 to measure the economizer outdoor airflow 84. The anemometer 43 may be electrically connected with the anemometer sensor 47 through the anemometer probe 45, such that the anemometer 43 is configured to receive the corresponding signals from the anemometer sensor 47 to measure airflow rates at the position of the anemometer sensor 47. The single access hole 79 may be located near a centerline 81 of the box 71. FIG. 4 shows an anemometer 43 with a display 53 (showing a 528.9 CFM average measurement), an on/off button 55, a hold/average button 57, a duct button 59 to enter a duct type (rectangular or circular) and dimensions (height×width or diameter), and an enter button 61 to capture an airflow value or average airflow values over a time function. For the time function, the airflow may be averaged or based on a first airflow measurement at a near side (to the single access hole 79), a second airflow measurement at a centerline (half way across a depth of the box 81), and a third airflow measurement at a far side (away from the single access hole 79). In an embodiment, the total time to measure airflow using the simple airflow method is less than 5 minutes, including drilling a single 5/16-inch diameter hole in the box 71. The centerline location may be disposed anywhere between the near side and the far side of the box.

It should be understood that each airflow identified within FIG. 4 corresponds to a type of HVAC system airflow that may be measured using the herein disclosed simple airflow measurement method. For example, the condenser airflow 74, HVAC system airflow 64 across the evaporator coil 69, and economizer outdoor airflow 84 may each be identified as types of HVAC system airflow. Similarly, the average condenser airflow, average HVAC system airflow across the evaporator coil, and average economizer outdoor airflow may be identified as types of average HVAC system airflows. The same relationships should also be understood to be present with corresponding minimum airflows, initial airflows, final airflows, etc. for the various airflow embodiments described for the HVAC system.

It should be further understood that each element of the HVAC system which is configured have airflow travel through it may be described as an airflow element of the HVAC system. As described above, in an embodiment, the HVAC system may comprise at least one airflow element selected from the group consisting of: an air register, such as a supply or return air register, a vent, a grill, a plenum, a duct, an economizer outdoor air damper 82, a condenser coil inlet 73 or a condenser fan outlet (such as condenser fan outlet 245 of FIG. 21). In an embodiment, a box may be reversibly engaged with a corresponding airflow element of the HVAC system, such that airflow traveling through the box is either received by or received from the airflow element of the HVAC system.

Figure 5:
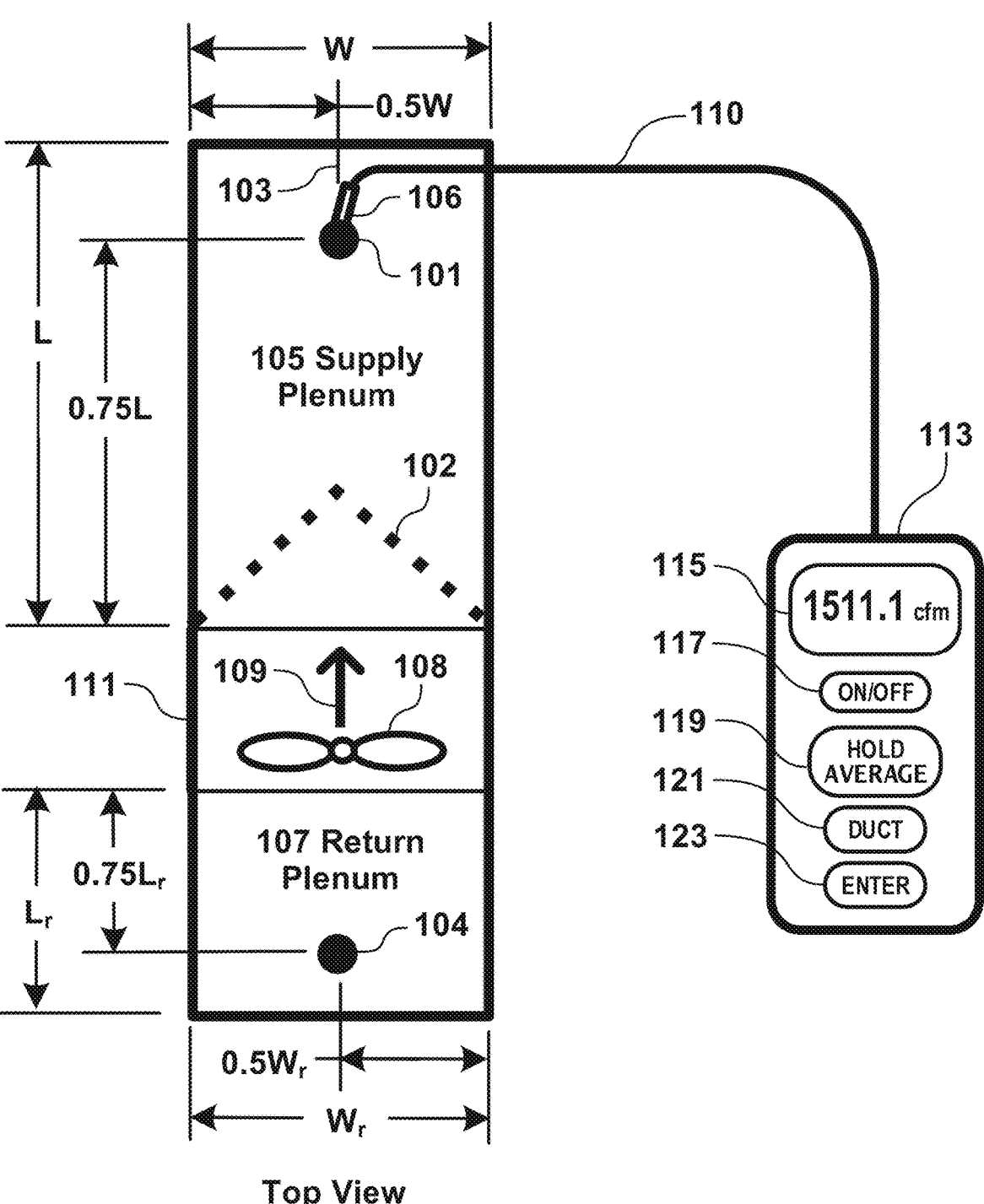
FIG. 5 shows a schematic diagram of an HVAC system showing a single supply access hole to insert a hot-wire anemometer probe to measure an HVAC airflow or a single return access hole to insert a hot-wire anemometer probe to measure the HVAC airflow.

FIG. 5 shows a top view schematic diagram of an HVAC system showing a single access hole 101 (typically 5/16" diameter) in a supply plenum 105 to insert a hot-wire anemometer probe 110 and a hot-wire anemometer sensor 106 into the supply plenum 105 (or a supply duct) to measure an HVAC system airflow 109 across an evaporator coil 102 or heat exchanger coil with an anemometer 113. If present, an existing access hole may also be used as the single access hole 101 for the hot-wire anemometer sensor 106 to be inserted into the supply plenum 105, as applicable. The single access hole 101 is preferably located on a width centerline 103 of the supply plenum 105. The lateral distance is based on 0.5 times a Width (W) of the supply plenum 105 (or a duct) with a Length (L). The single access hole 101 may further be located longitudinally 0.75 times a Length (L) of the supply plenum 105 from an FAU 111 containing an HVAC fan 108 which produces the HVAC system airflow 109. Alternatively, the single access hole 101 may be located approximately 0.75 times W and 0.75 times L. The single access hole 101 may be larger or smaller than 5/16-inch diameter and within +/−6 inches of the width centerline 103.

FIG. 5 also shows a return access hole 104 to insert the hot-wire anemometer sensor 106 in a return plenum 107 (or a return duct) to measure the HVAC system airflow 109 across an evaporator coil 102 with an anemometer 113. The location of the return access hole 104 is defined with respect to the return plenum 107 as laterally based on 0.5 times a Width of the return (Wr) and longitudinally 0.75 times a Length of the return (Lr). As noted above, the return access hole 104 may be located approximately 0.75 times W and 0.75 times Lr. The return access hole 104 may also be larger or smaller than 5/16-inch diameter and within +/−6 inches of the width centerline 103. In an embodiment, a temperature split (TS) across the evaporator coil based on a return air drybulb temperature minus a supply air drybulb temperature in degrees Fahrenheit (° F.) is measured with a first digital psychrometer probe inserted into the return access hole 104 or a return air register and a second digital psychrometer probe inserted into the single access hole 101 in the supply plenum or at a supply register.

FIG. 5 shows the anemometer 113 with a display 115 (showing a 1511.1 CFM average measurement), an on/off button 117, a hold/average button 119, a duct button 121 to enter duct type (rectangular or circular) and dimensions (height×width or diameter), and an enter button 123 to capture airflow values or average airflow values over time. For the time function, the airflow may be averaged or based on a longer duration on the near side than the far side wherein the N$_{time}$ is greater than the F$_{time}$ based on a higher airflow measured on the near side or vice versa if the higher airflow is measured on the far side. In an embodiment, the total time to measure airflow using the airflow measurement method is less than 5 minutes including drilling a single 5/16-inch diameter hole in the plenum or duct.

FIG. 6 shows a schematic diagram of the simple airflow measurement method used to measure an HVAC system airflow 39. The method uses an anemometer 114, an anemometer probe 112, and an anemometer sensor 142 inserted into a single access hole 125 at a width centerline 143 located a lateral distance 0.5 times a Width W of a supply plenum 141 (or a supply duct). In an embodiment, the anemometer 114 is configured to measure the CFM of an HVAC airflow 39 based on measurements of a near side airflow 127 measured at near side 131, a depth centerline airflow 133 measured at a depth centerline 139, and a far side airflow 135 measured at a far side 137 of the supply plenum 141. FIG. 6 also shows the anemometer 114 measuring a higher airflow value on a higher airflow side or a lower airflow value on a lower airflow side measured between the depth centerline 139 and a near side 131 or the depth centerline 139 and the far side 137 of the supply plenum 141. While FIG. 6 refers to HVAC airflow measurements in a supply plenum, in an alternative embodiment, the airflow measurements may also be performed in a return plenum. The depth centerline location may be disposed anywhere between the near side and the far side of the plenum, the duct or the box.

FIG. 6 shows the airflow measurement method measuring multiple airflow measurements on the far side, referred to as F far side 144 airflow measurements, and multiple airflow measurements on the near side, referred to as N near side 146 airflow measurements. If the disclosed airflow measurement method determines that the far side airflow 135 is greater than the near side airflow 127, then F>N (e.g., more airflow measurements will be taken on the far side of the corresponding structure). Alternatively, if F>N, then the disclosed airflow measurement method may instead measure the F far side 144 airflow measurements for a longer time duration than the N near side 146 airflow measurements, such that $F_{time}$ is greater than $N_{time}$. If the disclosed method determines that the near side airflow 127 is greater than the far side airflow 135, then N> For the method measures the N near side 146 airflow measurements for a longer time duration than the F far side 144 airflow measurements, wherein the $N_{time}$ is greater than the $F_{time}$. The herein disclosed method weights the airflow measurements to obtain a more accurate average airflow measurement of the HVAC airflow in the supply plenum 141 (or the supply duct). As noted above, the airflow measurements may also be performed in the return plenum or duct.

While the terms N (number of measurements taken on the near side) and $N_{time}$ (the amount of time spent taking near side measurements) are described herein, when N is greater than F, $N_{time}$ is also greater than $F_{time}$. As it takes additional time to take additional measurements, the number of measurements on a corresponding side is thus proportional to the amount of time spent taking measurements on the corresponding side. The same may also be described for the relationship between F and $F_{time}$, accordingly. As such, the discrepancy between amount of data collected between the near side and the far side (and the corresponding structure centerline measurements, as applicable) may be expressed in either number of measurements or time spent taking measurements, both of which articulate essentially the same relation.

As described hereinabove, FIG. 6 also shows an anemometer 114 used to measure the HVAC system airflow 39 with a display 116 showing a 1511.1 CFM average airflow measurement. FIG. 6 shows an on/off button 118, a hold/average button 120, a duct button 122 to enter duct type (rectangular or circular) and dimensions (height×width or diameter), and an enter button 124 to capture airflow values or average airflow values over time. A higher airflow value may occur on near side 131 with lower airflow value on far side 137 depending on location and position of blower fan outlet, branch ducts, or duct designs with respect to the plenum or duct or the air filter (not shown).

Figure 7:
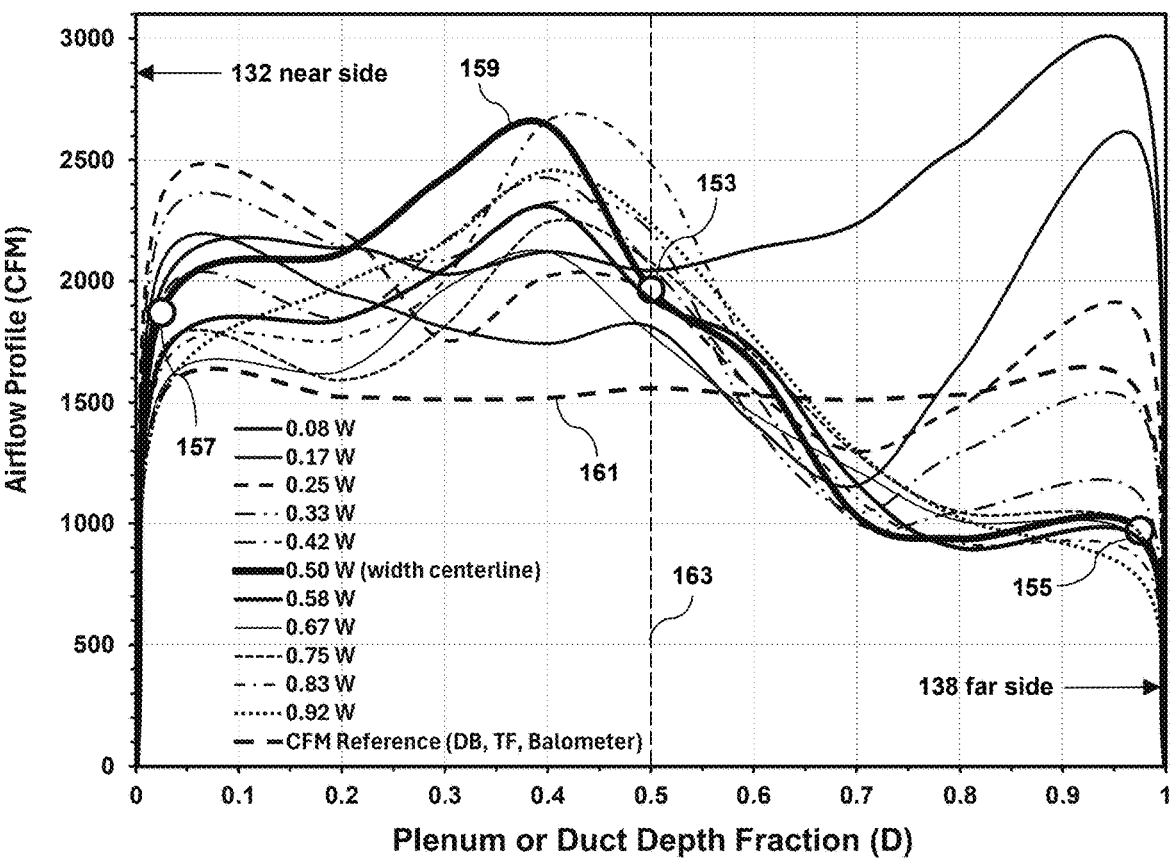
FIG. 7 shows two-dimensional (2D) airflow profiles (in CFM) for eleven sets of hot-wire anemometer measurements traversing a 20-inch deep by 24-inch wide plenum or duct indicating higher values on the near side at 0 to 2 inches depth, the centerline at 7 to 10 inches depth, and the far side at 18 to 20 inches of depth. Also shown is a CFM reference airflow profile for a fan-powered flow hood (Duct Blaster), pressure grid (Trueflow), and a balometer flow capture hood.

FIG. 7 shows a two-dimensional (2D) Airflow profile (in CFM) for eleven sets of hot-wire anemometer measurements traversing a plenum or a duct depth fraction based on a 20-inch deep by 24-inch wide plenum or duct cross sectional area. The airflow measurements are for eleven traverses from 0.08 to 0.92 times the Width (W). In the disclosed embodiment, the higher airflow measurements are on a near side 132 at 0 to 0.1 times D (or 0 to 2 inches depth), a depth centerline 163 at 0.35 to 0.5 times D (or 7 to 10 inches depth), and a far side 138 at 0.9 to 1 times D (or 18 to 20 inches of depth). Also shown is a CFM reference 161 airflow profile based on the average HVAC airflow measured with a fan-powered flow hood (Duct Blaster), a pressure grid (Trueflow), and a balometer flow capture hood. As described hereinabove, the disclosed simple airflow measurement method inserts a hot-wire anemometer probe into an access hole at the width centerline of a supply or return plenum or duct and measures a centerline airflow curve 159 by measuring a first airflow measurement 157 of 1870 CFM at 0 to 0.1 times D (or 0 to 2 inches) from the near side 132 of the plenum or the duct where the hot-wire anemometer probe is inserted (e.g., at the near side location). A second airflow measurement 153 of 1966 CFM is measured at 0.5+/−0.05 times D (or within +/−1 inches) of the depth centerline 163 (e.g., at the depth centerline location). A third airflow measurement 155 of 970 CFM is measured at a depth of 0.9 to 1 times D (or 18 to 20 inches) or 0 to 0.1 times D (or 0 to 2 inches) from the far side 138 of the plenum or the duct (e.g., at the far side location). The average airflow is 1602 CFM based on the three airflow measurements.

A balometer flow capture hood measured 1560 CFM (or 736 Liters Per Second or 736 LPS), a fan-powered flow hood (Duct Blaster or DB) measured 1488 CFM, and a pressure grid (Trueflow or TF) measured 1532 CFM. The first log-T anemometer method measured 1224 CFM which is 20% lower than the 1527 CFM average of the other methods. A second Log-T anemometer method measured 1744 CFM which is 14% greater than the 1527 CFM average of the other methods. The log-T anemometer methods made 99 to 189 measurements and took 30 minutes, compared to less than 5 minutes for the herein disclosed simple airflow measurement method shown in FIG. 1 and FIG. 2. In contrast, the simple airflow measurement method of FIG. 1 only used the first airflow measurement 157, the second airflow measurement 153 and/or the third airflow measurement 155 to calculate the average HVAC system airflow.

As described hereinabove, the disclosed simple airflow measurement method FIG. 2 may comprise making more than 50 percent of measurements on the side of the plenum or duct with the higher airflow, making the remaining airflow measurements between the depth centerline 163 and the opposite side with the lower airflow and averaging the airflow measurements to calculate the average airflow in the plenum or duct. In an embodiment, this method may comprise measuring airflow values on the higher airflow side for a longer time duration than the airflow values on the lower airflow side.

Figure 8:
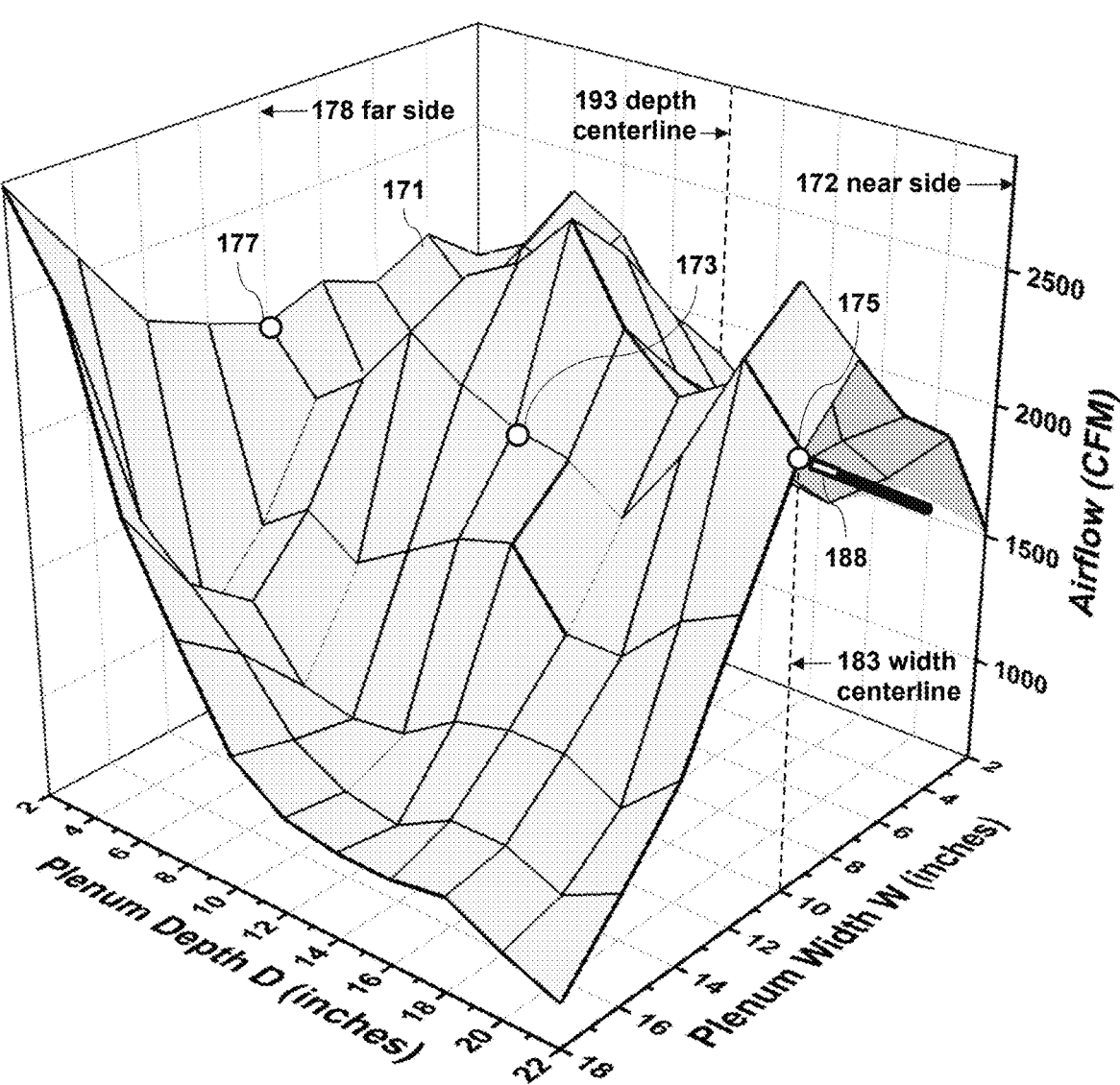
FIG. 8 shows a three-dimensional (3D) airflow surface (in CFM) for eleven sets of hot-wire anemometer measurements for a plenum or a duct that is approximately 20-inches deep by 24-inches wide.

FIG. 8 shows a three-dimensional (3D) airflow surface 171 (in CFM) for the eleven sets of hot-wire anemometer measurements for a plenum, a duct, or a box that is 20-inches deep by 24-inches wide. The herein disclosed airflow measurement method inserts a hot-wire anemometer probe 188 into an access hole (not shown) at a width centerline 183 of a supply or return plenum or duct and measures a centerline flowrate at a depth centerline 193 of the airflow surface 171 by measuring a first airflow measurement 175 of 1870 CFM at 0 to 2 inches from the near side 172 of the plenum or the duct where the hot-wire anemometer probe is inserted. A second airflow measurement 173 of 1966 CFM is measured within +/−1 inches of the depth centerline 193. A third airflow measurement 177 of 970 CFM is measured at 0 to 2 inches from the far side 178 of the plenum or the duct. Based on these three airflow measurements, the average HVAC airflow is 1602 CFM which is within 5% of the average airflow of 1527 CFM measured with the other methods.

FIG. 9 shows a prior art schematic diagram of a known log-Tchebycheff (log-T) method with thirty (30) or more traverse measurement points in a rectangular duct of Width (W) and Depth (D) to insert a hot-wire anemometer to measure HVAC airflow where there are 6 or more ⁵⁄₁₆-inch holes drilled in the plenum or duct at six (6) locations based on the Width (W) of the duct. Measurements are made at 30 locations based on the Depth (D) of the duct.

FIG. 10 shows a prior art table of traverse locations for the rectangular duct of FIG. 9 for the known log-Tf method for less than (<) 30 inches, 30 to 63 inches, and greater than 63 inches of Width (W) of the duct. Measurements are made at 30 to 49 locations based on the Depth (D) of the duct from the near wall. The known log-T method for rectangular ducts drills 6 or more holes and measuring at multiple locations which is tedious, time consuming, and complicated causing user errors.

FIG. 11 shows a prior art schematic diagram of the known log-T method with thirty (30) or more traverse measurement points in a circular duct less than 10 inches diameter to insert a hot-wire anemometer to measure HVAC airflow.

FIG. 12 shows a prior art table of traverse locations for the circular duct of FIG. 11 for the known log-T method for less than (<) 10 inches and greater than or equal to (≥) 10 inches. The known log-T method for circular ducts drills 3 or more holes and measuring at multiple locations which is tedious, time consuming, and complicated.

FIG. 13 shows a prior art schematic diagram of known log-T method with thirty (30) or more traverse measurement points in a circular duct ≥10 inches diameter to insert a hot-wire anemometer to measure HVAC airflow.

FIG. 14 provides a summary of airflow measurements (in CFM) comparing the relative accuracy of the disclosed simple airflow measurement method to the relative accuracy of the more complicated log-T method and the fan-powered flow hood (Duct Blaster), pressure grid (Trueflow), or balometer flow capture hood methods. The herein disclosed first simple airflow measurement method is 18 to 20% more accurate than the log-T method and takes less than 5 minutes to perform, compared to the other more complicated methods, such as the Duct Blaster, Trueflow, or balometer flow capture hood methods, which may take 30 to 60 minutes to perform.

Figure 15:
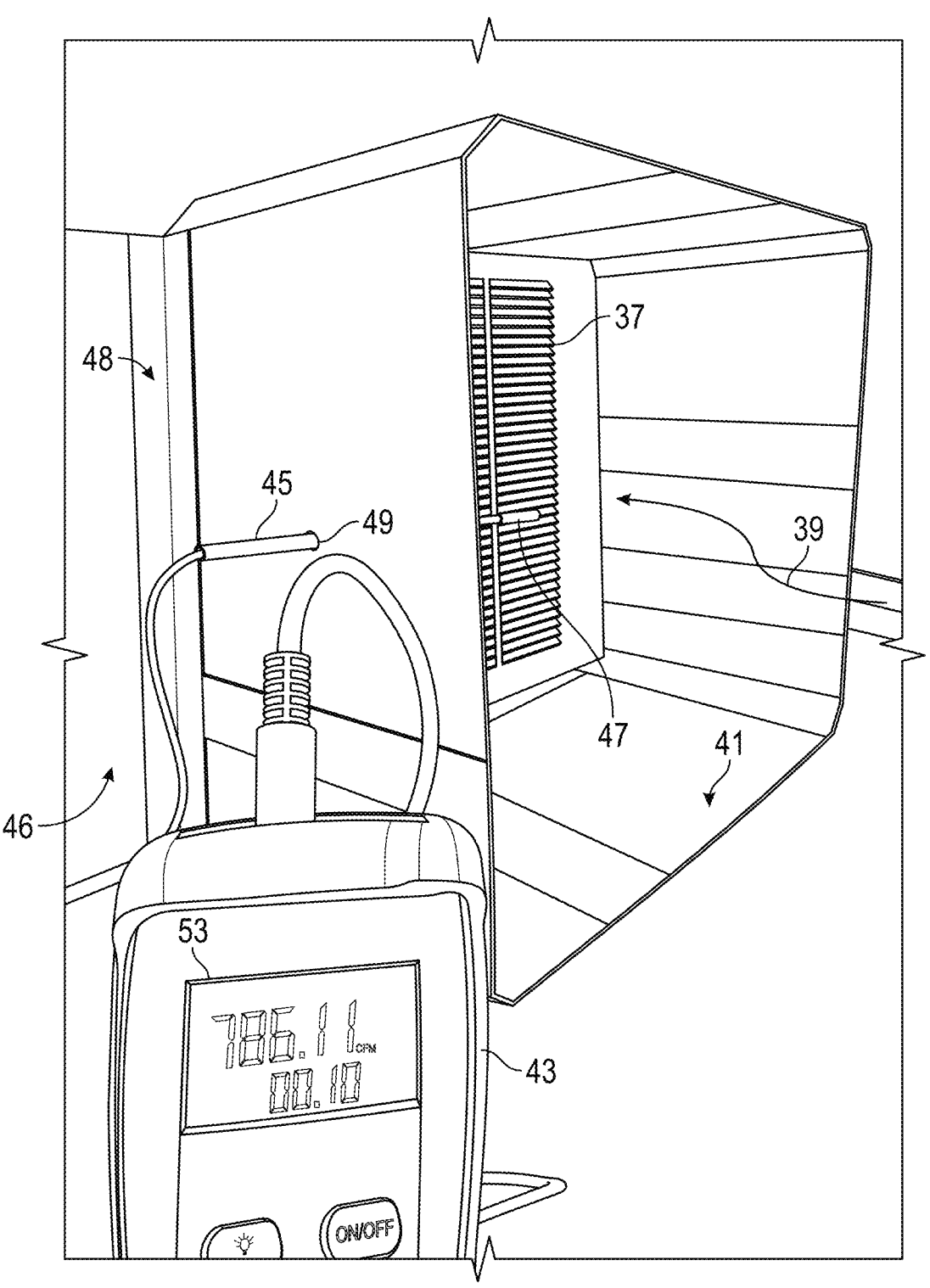
FIG. 15 shows an HVAC system without a return plenum with a box temporarily attached with masking tape or other attachment method to a wall, a ceiling, or a door surrounding a return or a supply air register, wherein the box has a single access hole to insert an anemometer probe to measure an HVAC system airflow with an anemometer.

FIG. 15 shows a box 41 temporarily attached with masking tape 48 or other attachment method to a wall 46, a ceiling, or a door surrounding the return register 37 of an HVAC system. FIG. 15 shows the box 41 has a single access hole 49 used to insert the anemometer probe 45 to measure the HVAC airflow 39 with the anemometer sensor 47 of an anemometer 43. FIG. 15 shows an HVAC airflow measurement of 766.11 CFM on the display 53 of the anemometer 43. In an embodiment, temporarily attaching the box 41 with the masking tape 48 to the wall 46 and the return register 37 and measuring the HVAC system airflow 39 with the anemometer takes about 10 to 15 minutes.

Figure 16:
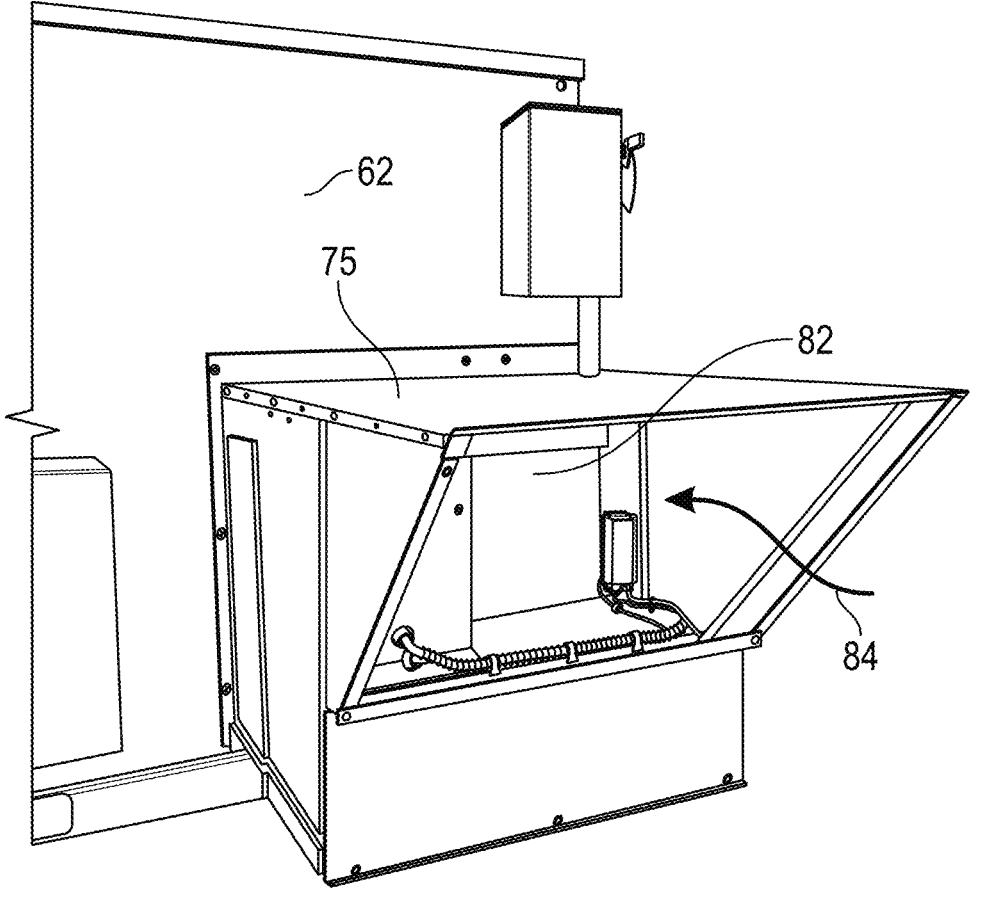
FIG. 16 shows an HVAC system, with an economizer, an outdoor air damper and the economizer outdoor airflow.

FIG. 16 shows an HVAC system 62 having an economizer 75, an outdoor air damper 82, and an economizer outdoor airflow 84 prior to the temporary installation of a box for taking airflow measurements.

Figure 17:
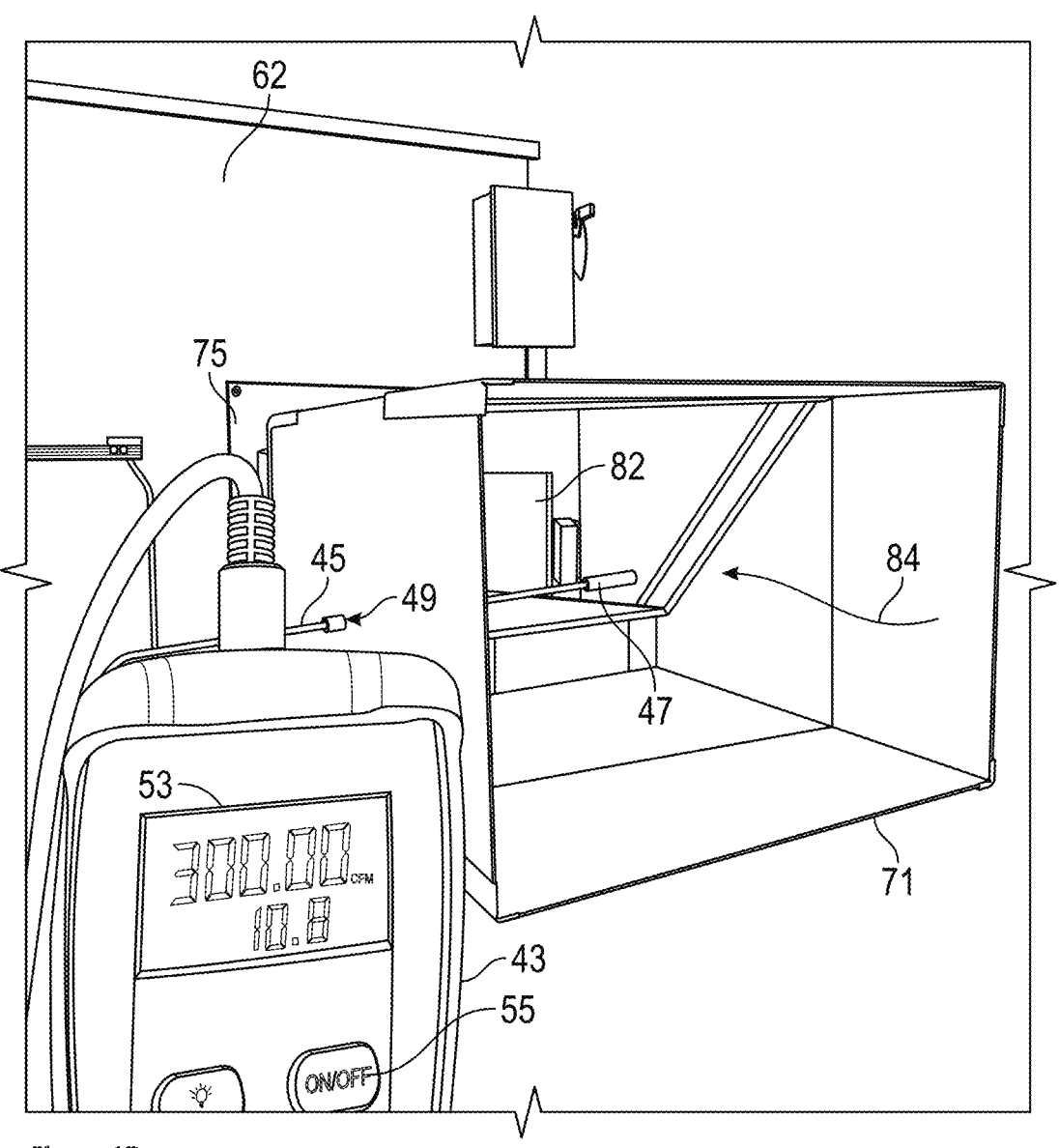
FIG. 17 shows an HVAC system with an economizer and a box temporarily attached with masking tape or other attachment method to the economizer surrounding the outdoor air damper, wherein the box has a single access hole to insert an anemometer probe to measure an economizer airflow with an anemometer.

FIG. 17 shows the HVAC system 62 of FIG. 16 with the economizer 75 surrounding the outdoor air damper 82 and a box 71 temporarily attached to the economizer 75 with masking tape, wherein the box 71 has a single access hole 49 to insert an anemometer probe 45 to measure an economizer outdoor airflow 84 with the anemometer sensor 47 of the anemometer 43. FIG. 17 shows an economizer outdoor airflow 84 measurement of 300 CFM on the display 53 of the anemometer 43, wherein the economizer outdoor airflow 84 measurement of 300 CFM at the minimum damper position is about 20% of the HVAC system airflow of 1500 CFM.

Figure 18:
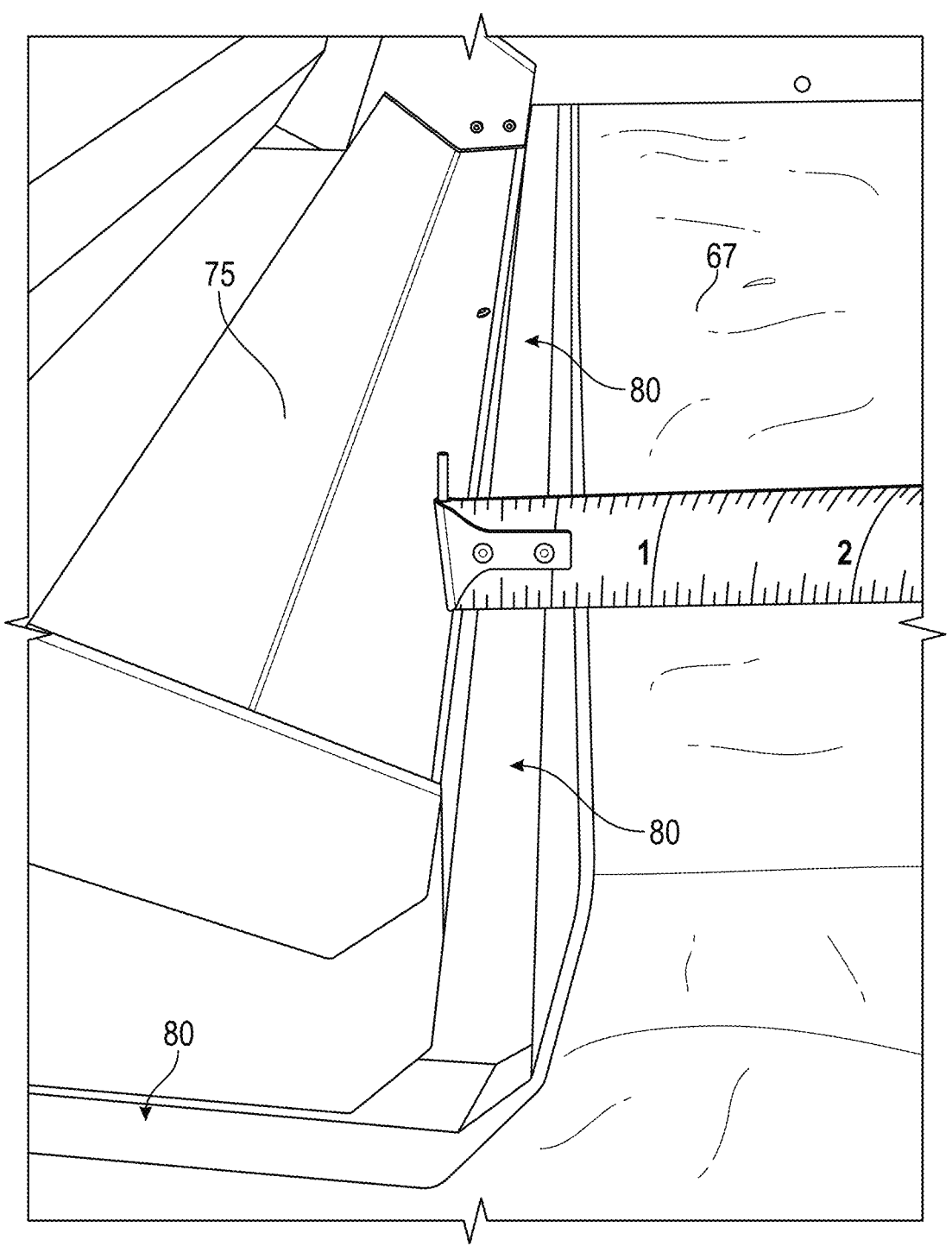
FIG. 18 shows an economizer installed inside an HVAC system before sealing an economizer perimeter gap, wherein the pre-existing economizer perimeter gap is approximately one-half inch wide allowing significant uncontrolled outdoor airflow ventilation which may increase cooling or heating loads and HVAC energy consumption.

FIG. 18 shows an economizer 75 installed in an HVAC system before sealing an economizer perimeter gap 80 in the return plenum 67, wherein the economizer perimeter gap 80 is approximately one-half inch wide, thus allowing significant uncontrolled outdoor airflow ventilation into the HVAC system, which may increase cooling or heating loads and HVAC energy consumption.

Figure 19:
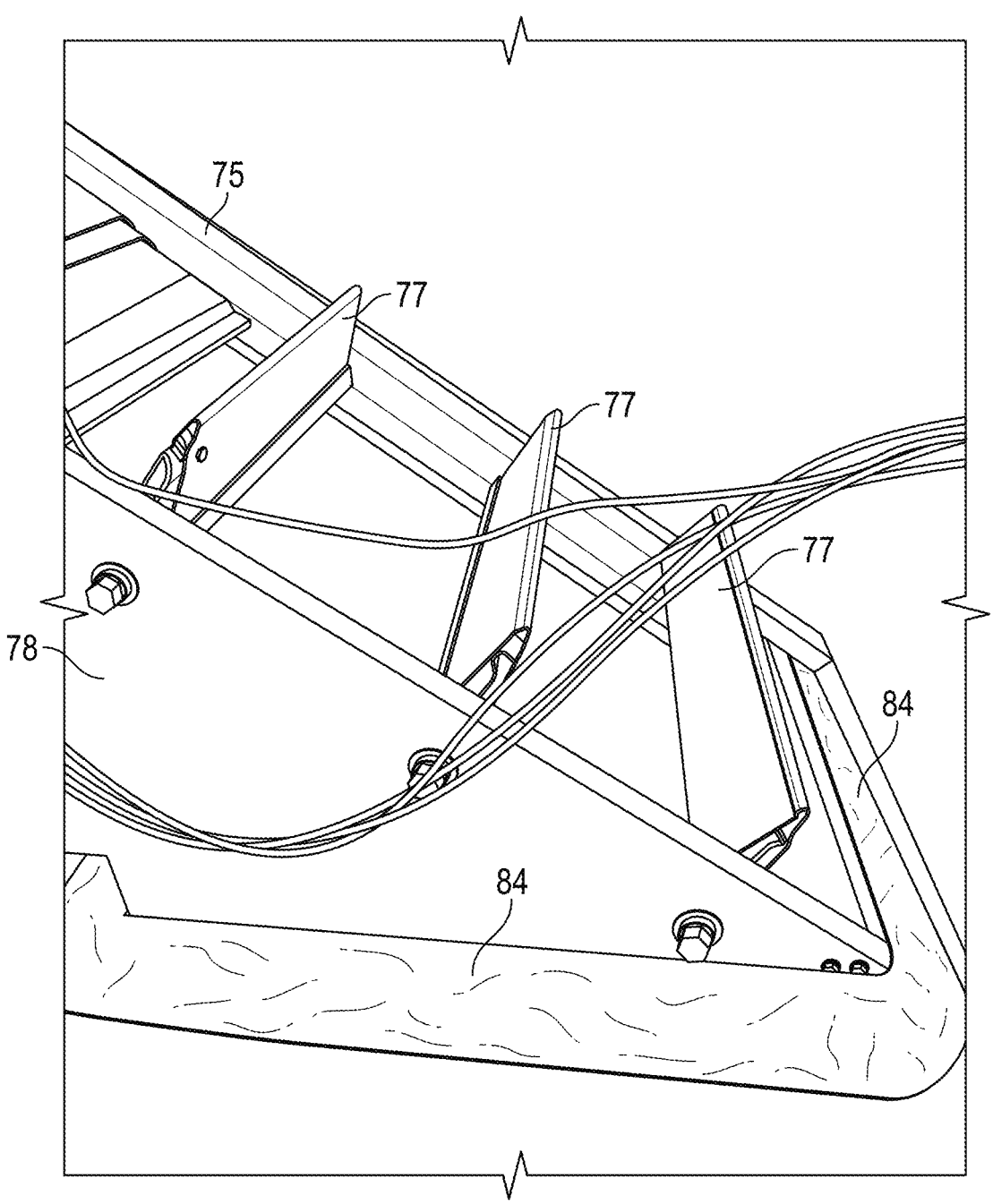
FIG. 19 shows an economizer installed inside an HVAC system after sealing the economizer perimeter gap to reduce outdoor air leakage and improve HVAC system cooling and heating efficiency.

FIG. 19 shows an economizer 75 installed inside an HVAC system with a sealed economizer perimeter gap 84. Also shown in FIG. 19 is the return air damper assembly 77 of the economizer 75 supported by the economizer frame 78. As can be seen in FIG. 19, The economizer perimeter gap, such as economizer perimeter gap 80 of FIG. 18, is sealed with a metal tape certified by Underwriters Laboratory (UL) to meet the UL 181A-P and/or UL 181B-FX standards for sealing and joining rigid or flexible air ducts and sheet metal with high shear adhesion, flame retardancy, UV resistance, and the ability to withstand temperature fluctuations. The economizer perimeter gap 80 may be sealed by other materials such as a mastic, a caulk, a sealant, a gasket, a sheet metal, or other tapes and sealing materials. The simple airflow measurement method is used to measure the HVAC system airflow and the economizer outdoor airflow before and after repairing the economizer and sealing the economizer perimeter gap.

FIG. 20 shows a side view of an HVAC system 62 with a box 91 temporarily attached with a masking tape 92 or other attachment method to the top of the HVAC system 62 wherein the box 91 is surrounding the condenser fan outlet, and the box has a single access hole 49 to insert an anemometer probe 45 to measure a condenser airflow 74 of the condenser fan outlet 245 (see FIG. 21) or the condenser coil inlet coil 73 with an anemometer 43. FIG. 20 shows the display 53 measuring a condenser airflow 74 of 2930.8 CFM which is 9.4% lower than the rated condenser airflow of 3200 CFM due to dirt or debris blocking the condenser coil inlet 73.

Figure 21:
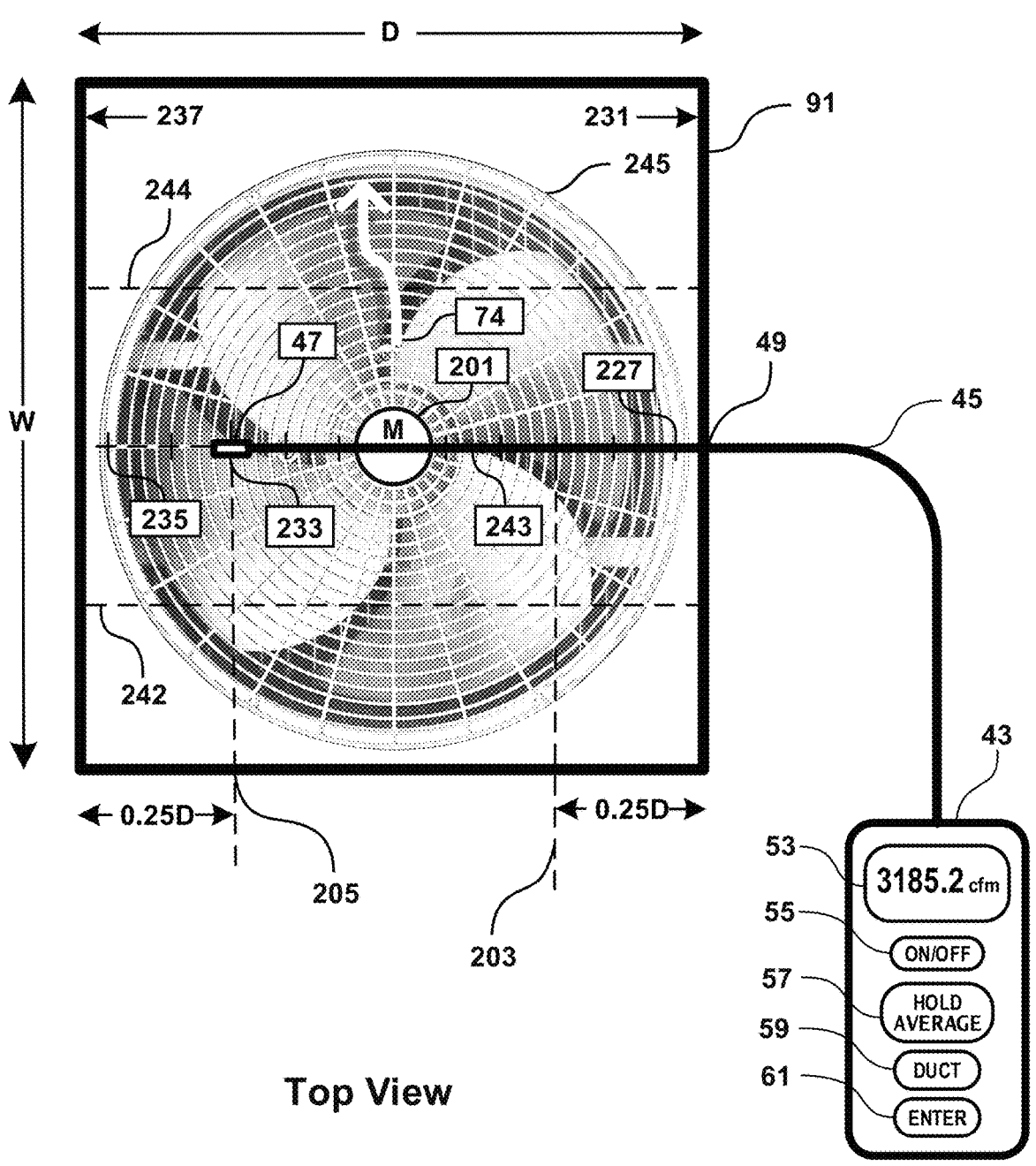
FIG. 21 shows a top view of an HVAC system with a box temporarily attached with masking tape or other attachment method to the top of the HVAC system surrounding the condenser fan outlet, wherein the box has a single access hole to insert an anemometer probe to measure a condenser airflow with an anemometer.

FIG. 21 shows a top view of an HVAC system, with a box 91 temporarily attached with masking tape to the top of the HVAC system surrounding the condenser fan outlet 245, wherein the box 91 has a single access hole 49 at a width centerline 243 to insert an anemometer probe 45 to measure a condenser airflow 74 of the condenser coil with an anemometer 43. In alternative embodiments, different attachment methods may be utilized to attach the box 91 to the HVAC system, and the single access hole 49 in the box 91 may be positioned at different locations on the near side 231 or the far side 237 of the box 91. In another embodiment, the single access hole 49 may be located on a one-quarter-line 242 or a three-quarter-line 244 at either side of the width centerline 243 of the condenser or another location in between the near side 231 or the far side 237 of the box 91. FIG. 21 shows the display 53 measuring an average condenser airflow 74 of 3185.2 CFM after cleaning the condenser coil which is within 1% of the rated condenser airflow of 3200 CFM. FIG. 21 shows the average anemometer measurement of the condenser airflow 74 is based on measuring a near side airflow 227 at a near side 231 (for a first airflow measurement), a far side airflow 235 measured the far side 237 (for a second airflow measurement), and a three quarter depth airflow 233 measured at a three quarter depth location 205 or a one quarter depth airflow measurement (not shown) measured at a one quarter depth location 203 (for a third airflow measurement). In an embodiment, the condenser fan motor 201 may block the condenser airflow 74 at the width centerline 243. To avoid potential airflow measurement issues that may be caused by the condenser fan motor 201, the condenser airflow may be measured at the three quarter depth location 205 or at the one quarter depth location 203 along the depth centerline instead of at the intersection of a depth centerline and width centerline (e.g. at the width and depth center of the corresponding structure). Alternatively, the airflow may be measured using a single hole located either side of the width centerline 243 to avoid the condenser fan motor 201. In an embodiment, additional condenser airflow measurements were made using a single hole at other alternative locations, such as at the one-quarter-line 242 or the three-quarter-line 244 or the left side of the width centerline 243 and the right side of the width centerline 243, which provided condenser airflow 74 measurements within +/−10% of 3200 CFM. The additional condenser airflow measurements indicate that the single hole may be located anywhere on the near side 231 or the far side 237 of the box. The single hole 49 at the width centerline 243 located on the near side 231 of the box 91 is shown as one example of the embodiment.

Field tests were performed with the simple airflow method for an HVAC system with an economizer. Before sealing the economizer perimeter gap with the economizer dampers closed, the HVAC system airflow was 1159 CFM and the economizer outdoor airflow was 634 CFM or 55% of the HVAC system airflow. With the damper 20% open, the HVAC system airflow was 1282 CFM and the economizer outdoor airflow was 580 CFM or 45% of the HVAC system airflow. With the economizer damper fully open the HVAC system airflow was 1602 CFM and the economizer outdoor airflow was 657 CFM or 41% of the HVAC system airflow.

After sealing the economizer perimeter gap with the economizer dampers closed, the HVAC system airflow was 1540 CFM and the economizer outdoor airflow which was 202 CFM or 13%. With the damper 20% open, the HVAC system airflow was 1711 CFM and the economizer outdoor airflow was 318 CFM or 19%. With the economizer damper fully open, the HVAC system airflow was 1467 CFM and the economizer outdoor airflow was 1028 CFM or 70%. The sealed economizer perimeter gap 84 reduced economizer outdoor airflow at the closed and minimum damper positions by 60 to 70%, improved cooling efficiency by 40 to 50%, and increased economizer cooling by 70%. Cooling energy savings are higher when the outdoor air temperature is greater than 95 degrees Fahrenheit (F). Heating energy savings will be greater when the outdoor air temperature is less than 50 F.

In an embodiment, the first simple airflow measurement method of FIG. 1 averages measurements using the following equation.

$$CFM_{ave} = \frac{\sum_{i=1}^{n} CFM_i + \sum_{j=1}^{c} CFM_j + \sum_{k=1}^{f} CFM_k}{n + c + f} \qquad \text{Eq. 3}$$

Where, $CFM_{ave}$=average airflow measured in Cubic Feet per Minute (CFM) or liters per second (LPS),
n=number of near side airflow measurements of plenum, duct, or box near a single access hole.
c=number of centerline airflow measurements at a centerline of plenum, duct, or box.
f=number of far side airflow measurements at far side of plenum, duct, or box at a far depth from a single access hole.

As such, for the first simple airflow method, the sum of the near side measurements $$\left(\sum_{i=1}^{n} CFM_i\right),$$

the sum of the centerline measurements $$\left(\sum_{j=1}^{c} CFM_j\right),$$

and the sum of the far side measure,emts $$\left(\sum_{k=1}^{f} CFM_k\right),$$

are added together and divided by the total quantity of measurements taken (n+c+f) to calculate the average airflow. In an embodiment, the second simple airflow measurement method of FIG. 2 averages measurements using the following equation.

$$CFM_{ave} = \frac{\sum_{i=1}^{h} CFM_i + \sum_{j=1}^{l} CFM_j}{h + l} \qquad \text{Eq. 4}$$

Where, $CFM_{ave}$=average airflow measured in Cubic Feet per Minute (CFM) or other units,
h=number of higher side airflow measurements from centerline of plenum, duct, or box towards higher airflow side.
l=number of lower side airflow measurements from center of plenum, duct, or box towards lower airflow side.

As such, for the second simple airflow method, the sum of the higher airflow side measurements $$\left(\sum_{i=1}^{h} CFM_i\right)$$

and the sum of the lower airflow side measurements $$\left(\sum_{j=1}^{l} CFM_j\right)$$

are added together and divided by the total quantity of measurements taken (h+l) to calculate the average airflow.

In an embodiment, a first simple airflow measurement method comprises measuring a Heating, Ventilating, Air Conditioning (HVAC) system airflow or an economizer outdoor airflow or a condenser airflow. The HVAC system airflow enters, traverses, or leaves at least one airflow element selected from the group consisting of: an air register, a vent, a grill, a plenum, a duct, an economizer outdoor air damper, a condenser coil inlet, or a condenser fan outlet. The first simple method may use a box to measure the HAVC system airflow, wherein the box is temporarily attached to the HVAC system and is configured to be in fluid communication with the HVAC system and the box is configured to be reversibly engaged with the HVAC system.

In an embodiment, the economizer outdoor air damper is controlled by an economizer controller (such as economizer controller 78 of FIG. 4) and connected to a supply and return damper assembly supported by an economizer frame. The air register may be a return air register, or a supply air register and the plenum may be a return air plenum or a supply air plenum. In an embodiment, the HVAC system may comprise more than one return air register and/or more than one supply air register.

In an embodiment, the first simple airflow method further comprises drilling a single access hole in a near side of the plenum, the duct, or the box, wherein the box is configured to be reversibly engaged with the economizer outdoor air damper or the air register. In said embodiment, the single access hole may be located anywhere in the plenum, the duct, or the box. The method further comprises inserting a hot-wire anemometer probe into the single access hole, positioning the hot-wire anemometer probe at a near side location disposed between the near side and a depth centerline of the plenum, the duct, or the box and taking a first airflow measurement while the hot-wire anemometer is in the single hole. In said embodiment, the first simple method further comprises positioning the hot-wire anemometer probe at the depth centerline location disposed on the depth centerline location disposed between the near side and a far side approximately halfway between the near side and the far side of the plenum, the duct, or the box and taking a second airflow measurement while the hot-wire anemometer is in the single hole. In said embodiment, the first simple method further comprises positioning the hot-wire anemometer probe at the far side location disposed between the depth centerline and the far side of the plenum, the duct, or the box and taking a third airflow measurement while the hot-wire anemometer is in the single hole. The first simple airflow measurement method may also comprise calculating an average HVAC system airflow or an average economizer outdoor airflow based on the first airflow measurement, the second airflow measurement, and the third airflow measurement, depending on the positioning of the single access hole. In an embodiment, an evaporator coil or heat exchanger may be nested within the plenum.

In an embodiment, the HVAC system airflow comprises at least one airflow selected from the group consisting of: the HVAC system airflow across the air register, the plenum, the duct or the box wherein the box is in fluid communication with the air register and the HVAC system airflow is entering or leaving the air register and the box is configured to be reversibly engaged with the air register; an economizer outdoor airflow across an economizer outdoor air damper of the HVAC system or the box, wherein the box is in fluid communication with the economizer outdoor air damper and the box is configured to be reversibly engaged with the economizer outdoor air damper; and a condenser airflow across a condenser fan outlet or a condenser coil of the HVAC system or the box, wherein the box is in fluid communication with the condenser fan outlet or the condenser coil inlet and the box is configured to be reversibly engaged with the condenser fan outlet or the condenser coil inlet. In another embodiment, the condenser airflow across the condenser fan outlet, or the condenser coil of the HVAC system or the box, is measured with the box in fluid communication with the condenser fan outlet or the condenser coil and the box is configured to be reversibly engaged with the condenser fan outlet or the condenser coil. In said embodiment, a first airflow measurement is taken by reading a near side airflow measurement at a near side location of the condenser fan outlet, the condenser coil inlet or the box, a second airflow measurement is taken by reading a far side airflow measurement at a far side location of the condenser fan outlet, the condenser coil inlet or the box, and a third airflow measurement is taken by reading a three quarter depth airflow measurement at a three quarter depth location of the condenser fan outlet, the condenser coil inlet or the box or reading a one quarter depth airflow measurement at a one quarter depth location of the condenser fan outlet, the condenser coil inlet or the box.

In an embodiment, the first simple airflow measurement method further comprises entering a cross sectional shape and dimensions of the plenum, the duct, or the box from which the measurements are taken into a digital hot-wire anemometer tool. In said embodiment, the first airflow measurement, the second airflow measurement, and the third airflow measurement may be measured as a volumetric airflow rate. The method may further comprise comparing the first airflow measurement to the second airflow measurement and the third airflow measurement and determining whether the near side location, the far side location, or the depth centerline location of the plenum or the duct provides a higher airflow. In an embodiment, the first simple airflow measurement method comprises performing at least one measurement selected from the group consisting of: measuring F far side airflow measurements and N near side airflow measurements wherein the N is greater than the For measuring airflow for a longer time duration at the near side location than at the far side location, wherein an $N_{time}$ is greater than an $F_{time}$, when the near side location has higher airflow than the far side location; measuring the F far side airflow measurements and the N near side airflow measurements wherein the F is greater than the N or measuring the airflow for the longer time duration at the far side location than at the near side location, wherein the $F_{time}$ is greater than the $N_{time}$, when the far side location has higher airflow than the near side location; measuring the F far side airflow measurements and the N near side airflow measurements wherein the F is equal to the N or measuring the airflow for an equivalent duration at the far side location and at the near side location, when the airflow at the near side location and the airflow at the far side location are each less than the second airflow measurement; measuring C centerline airflow measurements, N near side airflow measurements and F far side airflow measurements, wherein the C is greater than N and C is greater than F or measuring the airflow for the longer time duration at the depth centerline location than at the near side location or the far side location, wherein a Crime is greater than the $N_{time}$ and $C_{time}$ is greater than the $F_{time}$, when the depth centerline location has higher airflow than the near side location and the depth centerline location has higher airflow than the far side location; and calculating the average HVAC system airflow based on a weighted average of the N near side airflow measurements, the C centerline airflow measurements, and the F far side airflow measurements.

In an embodiment, the disclosed simple airflow measurement method comprises calculating an average HVAC system airflow or an average economizer outdoor airflow based on a weighted average of the N near side airflow measurements, the C centerline airflow measurements, and the F far side airflow measurements. In said embodiment, the method comprises measuring more than 50% of the airflow measurements on a higher airflow side (e.g., the near side, the centerline, or the far side) and measuring less than 50% of the airflow measurements on a lower airflow side(s) (e.g., the "sides" that do not have the highest airflow) based on a time duration. In said embodiment, the airflow measurements measured on the higher airflow side are measured over a longer time duration than the airflow measurements measured on the lower airflow side(s). In short, more time is spent taking airflow measurements on the higher airflow side than on the lower airflow side in said embodiment, thus resulting in there being more airflow measurements for the higher airflow side than the lower airflow side(s).

In an embodiment, a second simple airflow measurement method for measuring a HVAC system airflow across an evaporator or heat exchanger coil, measuring an economizer outdoor airflow, or measuring condenser airflow, comprises drilling a single hole in a plenum, a duct, or a box, wherein the box is configured to be reversibly engaged with a return air register, an economizer outdoor air damper, a condenser fan outlet or a condenser coil, respectively; and inserting a hot-wire anemometer probe in the single hole. The second simple airflow measurement method may further comprise measuring a far side airflow, a centerline airflow, and a near side airflow. In an embodiment, the second simple airflow measurement method determines which side of a centerline of the plenum the duct, or the box (e.g., the near side or the far side) provides higher airflow values compared to a centerline airflow value. This method may also comprise measuring more than 50% of the airflow values on the higher airflow side and measuring less than 50% of airflow values on the lower airflow side. Furthermore, this second simple airflow measurement method comprises calculating an average HVAC system airflow based on a sum of the higher side airflow values plus the sum of the lower airflow values divided by a total quantity of measured airflow values.

In an embodiment, the second airflow measurement method comprises entering a cross sectional shape and dimensions of the plenum or the duct into a digital hot-wire anemometer tool. In said embodiment, the far side airflow, the centerline airflow, and the near side airflow are measured as volumetric airflow rates. In an embodiment, measuring the higher side airflow value comprises inserting the hot-wire anemometer probe into the one hole and locating/positioning the hot-wire anemometer probe between the centerline of the plenum or the duct and the far side of the plenum or the duct and taking a far side airflow measurement and further locating/positioning the hot-wire anemometer probe between the centerline of the plenum or the duct and the near side of the plenum or the duct and taking a near side airflow measurement.

In an embodiment, taking a far side airflow measurement at a far side location, a depth centerline airflow measurement at a depth centerline location, and a near side airflow measurement at a near side location comprises positioning the hot-wire anemometer probe between the depth centerline of the plenum, the duct, or the box and the far side of the plenum, the duct, or the box and taking the far side airflow measurement, positioning the hot wire anemometer probe at the depth centerline of the plenum, the duct, or the box and taking a depth centerline airflow measurement, and positioning the hot-wire anemometer probe between the depth centerline of the plenum, the duct, or the box and a near side of the plenum, the duct, or the box, and taking the near side airflow measurement. The second simple airflow measurement method may further comprise comparing the far side airflow measurement to the near side airflow measurement and the centerline airflow measurement and determining a higher side airflow value based on the far side airflow, the centerline airflow, and the near side airflow.

The second simple airflow measurement method may comprise performing additional airflow measurements while the hot-wire anemometer probe is in the single hole, wherein more than 50% of the additional airflow measurements are measured on the higher airflow side and less than 50% of the additional airflow measurements are measured on a lower airflow side; and calculating an average HVAC system airflow based on a sum of the additional airflow measurements divided by a total quantity of the additional airflow measurements. The second simple airflow measurement method may comprise performing the additional airflow measurements based on durations, wherein airflow measurements on the higher airflow side are measured over a longer duration than the airflow measurements on the lower airflow side.

In an embodiment, the disclosed method for measuring an HVAC system airflow across an evaporator or heat exchanger coil, measuring an economizer outdoor airflow, or measuring condenser airflow comprises drilling a single hole in a near side of a plenum, a duct, or a box, wherein the box is reversibly engaged with a return air register, an economizer outdoor air damper, a condenser fan outlet or a condenser coil, respectively; inserting a hot-wire anemometer probe in the single hole, wherein the single hole is disposed within the plenum, the duct, or the box; taking at least one airflow measurement selected from the group consisting of: positioning the hot-wire anemometer probe at a near side location disposed between a near side and a depth centerline of the plenum, the duct, or the box and taking a near side airflow measurement with the hot-wire anemometer probe, positioning the hot-wire anemometer probe at a centerline location disposed midway between the near side and a far side of the plenum, the duct, or the box and taking a centerline airflow measurement with the hot-wire anemometer probe, and positioning the hot-wire anemometer probe at a far side location disposed between the far side and the depth centerline of the plenum, the duct, or the box and taking a far side airflow measurement with the hot-wire anemometer probe; and calculating an average HVAC system airflow based on the at least one airflow measurement.

In an embodiment, the disclosed method for measuring the HVAC system airflow for an HVAC system is provided, the HVAC system comprising at least one airflow element selected from the group consisting of: an air register, a vent, a grill, a plenum, a duct, an economizer outdoor air damper, a condenser coil inlet, a condenser fan outlet, or a box temporarily attached to the HVAC system, wherein the box is configured to be in fluid communication with the HVAC system and reversibly engaged with the HVAC system, wherein the HVAC system airflow is entering or leaving the box or the at least one airflow element of the HVAC system. The disclosed method comprises inserting a hot-wire anemometer probe in a single hole, wherein the single hole is disposed within the box, and performing at least one action selected from the group consisting of: positioning the hot-wire anemometer probe at a near side location disposed between a near side and a depth centerline of the box and taking a near side airflow measurement with the hot-wire anemometer probe while the hot-wire anemometer probe is in the single hole, positioning the hot-wire anemometer probe at a centerline location disposed between the near side and a far side of the box and taking a centerline airflow measurement with the hot-wire anemometer probe while the hot-wire anemometer probe is in the single hole, positioning the hot-wire anemometer probe at a far side location disposed between the far side and the depth centerline of the box and taking a far side airflow measurement with the hot-wire anemometer probe while the hot-wire anemometer probe is in the single hole, and calculating an average HVAC system airflow based on the at least one airflow measurement.

In an embodiment, when the average HVAC system airflow (CFM$_a$) is less than a minimum HVAC system airflow (MIN), the average economizer outdoor airflow is less than or greater than a minimum economizer outdoor airflow, or the average condenser airflow is less than a minimum condenser airflow, the average HVAC system airflow, the average economizer outdoor airflow or the average condenser airflow may be increased or adjusted. In said embodiment, the average HVAC system airflow or the average economizer outdoor airflow or the average condenser airflow are increased or adjusted by at least one of: repairing an economizer, wherein the economizer comprises an economizer controller, an economizer actuator, the economizer outdoor damper or an economizer return air damper, sealing an economizer perimeter gap around the economizer outdoor air damper or the economizer return air damper, repairing crushed or leaking ducts, repairing insulation blocking airflow, opening registers, increasing duct size (diameter or cross-sectional area to reduce a static pressure), increasing fan speed, defrosting and cleaning an evaporator coil, replacing a capacitor, cleaning a condenser coil, or cleaning a heat exchanger. The economizer, the evaporator coil and the heat exchanger are disposed within the HVAC system and configured to change a temperature of the average HVAC system airflow. Adjusting the HVAC system airflow may involve increasing or decreasing airflow to improve energy efficiency, comfort, or performance. To meet minimum ventilation requirements for indoor air quality, the minimum economizer outdoor airflow might vary from 10 to 50 percent. For economizer cooling, the minimum economizer outdoor airflow might vary from 60 to 100 percent.

In an embodiment, the airflow measurement method comprises entering a cross sectional shape and dimensions of the plenum or the duct into a digital hot-wire anemometer tool. The first airflow, the second airflow, and the third airflow are measured as a volumetric airflow rate. In an embodiment the box is secured with an adhesive tape or other attachment method to a wall, a ceiling, or a door surrounding a return grill and the box overlaps a return grill to capture the HVAC system airflow through the return grill.

In an embodiment, the airflow measurement method comprises drilling or using a single hole (if the hole is already present) in a near side of a plenum, a duct, or a box, wherein the box is reversibly engaged with/attached to a return air register; inserting a hot-wire anemometer probe in the single hole; positioning the hot-wire anemometer probe at a near side location disposed between a near side and a depth centerline of the plenum, the duct, or the box, and measuring airflow at the near side location with the hot-wire anemometer and positioning the hot-wire anemometer probe at a far side location disposed between a far side and the depth centerline (or centerline) of the plenum, the duct, or the box, and measuring airflow at the far side location with the hot-wire anemometer; and calculating an average HVAC system airflow based on the airflow measurements. Alternatively, the single hole may be located on the far side of the plenum, the duct, or the box.

In an embodiment, the airflow measurement method comprises calculating and reporting a cooling energy efficiency improvement or a heating energy efficiency improvement. The cooling efficiency improvement (or EER* improvement) is calculated based on measurements of an initial average HVAC system airflow or an initial average economizer outdoor airflow and an initial temperature split across the evaporator coil before increasing or adjusting the average HVAC system airflow or the average economizer outdoor airflow, and a final average HVAC system airflow or a final average economizer outdoor airflow and a final temperature split across the evaporator coil after increasing or adjusting the average HVAC system airflow or the average economizer outdoor airflow. The temperature split across the evaporator coil is based on a return air drybulb temperature minus a supply air drybulb temperature. The heating efficiency improvement is calculated based on the measurements of the initial average HVAC system airflow or the initial average economizer outdoor airflow and an initial temperature rise across the heat exchanger before increasing or adjusting the average HVAC system airflow or the average economizer outdoor airflow, and the final average HVAC system airflow or the final average economizer outdoor airflow and a final temperature rise across the heat exchanger after increasing or adjusting the average HVAC system airflow or the average economizer outdoor airflow. The temperature rise across the heat exchanger is based on the supply air drybulb temperature minus the return air drybulb temperature.

In an embodiment, the airflow measurement method comprises reporting an energy efficiency ratio (EER*) improvement. The EER* improvement is calculated based on measurements of an initial average HVAC system airflow or the average economizer outdoor airflow and an initial temperature split across the evaporator coil and a final temperature split across the evaporator coil after adding refrigerant to an air conditioning system. The EER* improvement may also be calculated based on measurements of an initial average HVAC system airflow or the initial average economizer outdoor airflow and an initial temperature split across the evaporator coil before increasing the average HVAC system airflow or the average economizer outdoor airflow, and a final average HVAC system airflow or the final average economizer outdoor airflow and a final temperature split across the evaporator coil after increasing the average HVAC system airflow.

In an embodiment the airflow measurement method comprises positioning a shield on a windward side of the box to reduce a wind-induced pressure on an open inlet side of the box, thereby improving airflow measurement accuracy during windy outdoor conditions.

While the method has been described by means of applications thereof, numerous modifications and variations could be made thereto by those skilled in the art without departing from the scope of the description set forth in the claims.

The invention claimed is:

1. A method for measuring a Heating, Ventilating, Air Conditioning (HVAC) system airflow for an HVAC system, the HVAC system having at least one airflow element selected from the group consisting of: an air register, a vent, a grill, a plenum, a duct, an economizer outdoor air damper, a condenser coil inlet, a condenser fan outlet, or a box temporarily attached to the HVAC system, wherein the box is configured to be in fluid communication with the HVAC system and reversibly engaged with the HVAC system, wherein the HVAC system airflow is entering or leaving the box or the at least one airflow element of the HVAC system, the method comprising:

drilling a single access hole in a near side of the at least one airflow element;

inserting a hot-wire anemometer probe into the single access hole;

positioning the hot-wire anemometer probe at a near side location disposed between the near side and a depth centerline of the at least one airflow element and taking a first airflow measurement while the hot-wire anemometer is in the single hole;

positioning the hot-wire anemometer probe at a depth centerline location disposed between the near side and a far side of the at least one airflow element and taking a second airflow measurement while the hot-wire anemometer is in the single hole;

positioning the hot-wire anemometer probe at a far side location disposed between the depth centerline and the far side of the at least one airflow element and taking a third airflow measurement while the hot-wire anemometer is in the single hole; and calculating an average HVAC system airflow based on the first airflow measurement, the second airflow measurement, and the third airflow measurement.

2. The method of claim 1, wherein the HVAC system airflow comprises one of:

the HVAC system airflow across the at least one airflow element, an economizer outdoor airflow across the economizer outdoor air damper of the HVAC system or the box, wherein the box is configured to be in fluid communication with the economizer outdoor air damper and reversibly engaged with the economizer outdoor air damper, and a condenser airflow across the condenser fan outlet or the condenser coil inlet of the HVAC system or the box, wherein, the box is configured to be in fluid communication with the condenser fan outlet or the condenser coil inlet and reversibly engaged with the condenser fan outlet or the condenser coil inlet.

3. The method of claim 1, further comprising entering a cross sectional shape and dimensions of the at least one airflow element into a digital hot-wire anemometer tool, wherein the digital hot-wire anemometer tool is in electrical communication with the hot-wire anemometer probe.

4. The method of claim 1, further comprising adjusting the average HVAC system airflow across the at least one airflow element by at least one of:

repairing an economizer, wherein the economizer comprises an economizer controller, an economizer actuator, the economizer outdoor damper or an economizer return air damper, sealing an economizer perimeter gap around the economizer outdoor air damper or the economizer return air damper, repairing crushed or leaking ducts, repairing insulation blocking airflow, opening registers, increasing duct size, increasing fan speed, defrosting and cleaning an evaporator coil, replacing a capacitor, cleaning a condenser coil, or cleaning a heat exchanger, wherein the economizer, the evaporator coil and the heat exchanger are disposed within the HVAC system and configured to change a temperature of the average HVAC system airflow.

5. The method of claim 4, further comprising reporting at least one of:

a cooling efficiency improvement, wherein the cooling efficiency improvement is calculated based on measurements of an initial average HVAC system airflow and an initial temperature split across the evaporator coil before adjusting the average HVAC system airflow and a final average HVAC system airflow and a final temperature split across the evaporator coil after adjusting the average HVAC system airflow, wherein the temperature split across the evaporator coil is based on a return air drybulb temperature minus a supply air drybulb temperature; or a heating efficiency improvement, wherein the heating efficiency improvement is calculated based on the measurements of the initial average HVAC system airflow and an initial temperature rise across the heat exchanger before adjusting the average HVAC system airflow and the final average HVAC system airflow and a final temperature rise across the heat exchanger after adjusting the average HVAC system airflow, wherein temperature rise across the heat exchanger is based on the supply air drybulb temperature minus the return air drybulb temperature.

6. The method of claim 1, further comprising comparing the first airflow measurement to the second airflow measurement and the third airflow measurement and determining whether the near side location, the far side location, or the depth centerline location of the at least one airflow element provides a higher airflow and performing at least one of:

measuring F far side airflow measurements and N near side airflow measurements, wherein the N is greater than the F, or measuring airflow for a longer duration at the near side location than at the far side location, wherein an $N_{time}$ is greater than an $F_{time}$, when the near side location has the higher airflow than the far side location, measuring the F far side airflow measurements and the N near side airflow measurements, wherein the F is greater than the N or measuring the airflow for the longer duration at the far side location than at the near side location, wherein the $F_{time}$ is greater than the $N_{time}$, when the far side location has the higher airflow than the near side location, measuring the F far side airflow measurements and the N near side airflow measurements, wherein the F is equal to the N or measuring the airflow for an equivalent duration at the far side location and the near side location, when the airflow at the near side location and the airflow at the far side location are less than the airflow at the depth centerline location, measuring C depth centerline airflow measurements, the N near side airflow measurements and the F far side airflow measurements, wherein the C is greater than the N and the C is greater than the F, or measuring the airflow for the longer duration at the depth centerline location than at the near side location or at the far side location, wherein a $C_{time}$ is greater than the $N_{time}$ and the $C_{time}$ is greater than the $F_{time}$, when the depth centerline location has the higher airflow than the near side location and the depth centerline location has the higher airflow than the far side location, or calculating the average HVAC system airflow based on a weighted average of the N near side airflow measurements, the C centerline airflow measurements, and the F far side airflow measurements.

7. The method of claim 1, further comprising measuring N airflow measurements at the near side location, C airflow measurements at the depth centerline location, and F airflow measurements at the far side location, wherein the airflow measurements are measured on a higher airflow side over a longer time duration than the airflow measurements measured on a lower airflow side.

8. The method of claim 1, further comprising positioning a wind shield on a windward side of the box to reduce a wind-induced pressure on an open inlet side of the box, thereby improving airflow measurement accuracy during windy outdoor conditions.

9. A method for measuring a Heating, Ventilating, Air Conditioning (HVAC) system airflow for an HVAC system, the HVAC system having at least one airflow element selected from the group consisting of: an air register, a vent, a grill, a plenum, a duct, an economizer outdoor air damper, a condenser coil inlet, a condenser fan outlet, or a box temporarily attached to the HVAC system, wherein the box is configured to be in fluid communication with the HVAC system and reversibly engaged with the HVAC system, wherein the HVAC system airflow is entering or leaving the box or the at least one airflow element of the HVAC system, the method comprising:

drilling a single hole in the at least one airflow element;
  inserting a hot-wire anemometer probe in the single hole;
  taking a far side airflow measurement at a far side location of the at least one airflow element, a depth centerline airflow measurement at a depth centerline location between the far side and a near side of the at least one airflow element, and a near side airflow measurement at a near side location of the at least one airflow element while the hot-wire anemometer is in the single hole;
  determining which side of a depth centerline of the at least one airflow element provides a higher airflow;
  performing additional airflow measurements while the hot-wire anemometer probe is in the single hole, wherein more than 50% of the additional airflow measurements are measured on the higher airflow side and less than 50% of the additional airflow measurements are measured on a lower airflow side; and
  calculating an average HVAC system airflow based on a sum of the additional airflow measurements divided by a total quantity of the additional airflow measurements.

10. The method of claim 9, wherein the HVAC system airflow comprises one of:

the HVAC system airflow across the at least one airflow element,
  an economizer outdoor airflow across the economizer outdoor air damper of the HVAC system or the box, wherein the box is configured to be in fluid communication and reversibly engaged with the economizer outdoor air damper, and
  a condenser airflow across the condenser fan outlet or the condenser coil inlet of the HVAC system or the box, wherein, the box is configured to be in fluid communication and reversibly engaged with the condenser fan outlet or the condenser coil.

11. The method of claim 9, further comprising entering a cross sectional shape and dimensions of the at least one airflow element into a digital hot-wire anemometer tool, wherein the digital hot-wire anemometer tool is in electrical communication with the hot-wire anemometer probe.

12. The method of claim 9, further comprising adjusting the average HVAC system airflow across the at least one airflow element by at least one of: repairing an economizer, wherein the economizer comprises an economizer controller, an economizer actuator, the economizer outdoor damper or an economizer return air damper, sealing an economizer perimeter gap around the economizer outdoor air damper or the economizer return air damper, repairing a crushed or a leaking duct, repairing an insulation blocking the airflow, opening at least one air register, increasing a duct size, increasing a fan speed, defrosting and cleaning an evaporator coil, replacing a capacitor, cleaning a condenser coil, or cleaning a heat exchanger, wherein the economizer and the evaporator coil are disposed within the HVAC system and configured to change a temperature of the average HVAC system airflow.

13. The method of claim 12, further comprising reporting at least one of:

a cooling efficiency improvement, wherein the cooling efficiency improvement is calculated based on measurements of an initial average HVAC system airflow and an initial temperature split across the evaporator coil before adjusting the average HVAC system airflow, and a final average HVAC system airflow and a final temperature split across the evaporator coil after adjusting the average HVAC system airflow, wherein the temperature split across the evaporator coil is based on a return air drybulb temperature minus a supply air drybulb temperature, or
  a heating efficiency improvement, wherein the heating efficiency improvement is calculated based on the measurements of the initial average HVAC system airflow and an initial temperature rise across the heat exchanger before adjusting the average HVAC system airflow, and the final average HVAC system airflow and a final temperature rise across the heat exchanger after adjusting the average HVAC system airflow, wherein temperature rise across the heat exchanger is based on the supply air drybulb temperature minus the return air drybulb temperature.

14. The method of claim 9, wherein taking the far side airflow measurement at the far side location, the depth centerline airflow measurement at the depth centerline location, and the near side airflow measurement at the near side location comprises positioning the hot-wire anemometer probe between the depth centerline of the at least one airflow element and the far side of the at least one airflow element and taking the far side airflow measurement, positioning the hot-wire anemometer probe at the depth centerline of the at least one airflow element and taking the depth centerline airflow measurement, and positioning the hot-wire anemometer probe between the depth centerline of the at least one airflow element and the near side of the at least one airflow element, and taking the near side airflow measurement.

15. The method of claim 9, wherein performing the additional airflow measurements is based on durations, wherein airflow measurements on the higher airflow side are measured over a longer duration than the airflow measurements on the lower airflow side.

16. A method for measuring a Heating, Ventilating, Air Conditioning (HVAC) system airflow, the HVAC system having at least one airflow element selected from the group consisting of: an air register, a vent, a grill, a plenum, a duct, an economizer outdoor air damper, a condenser coil inlet, or a condenser fan outlet, wherein a box is temporarily attached to the HVAC system and the box is configured to be in fluid communication with and reversibly engaged with the HVAC system and the HVAC system airflow is entering or leaving the box or the at least one airflow element of the HVAC system, the method comprising:

inserting a hot-wire anemometer probe in a single hole, wherein the single hole is disposed within the box and is located on any side of the box, wherein the HVAC system airflow comprises one of:

the HVAC system airflow across the box, wherein the box is in fluid communication with the at least one airflow element, and the box is configured to surround and be reversibly engaged with the at least one airflow element, such that the box overlaps with the at least one airflow element to capture HVAC system airflow through the at least one airflow element, an economizer outdoor airflow across the economizer outdoor air damper of the HVAC system or the box, wherein the box is configured to be in fluid communication with and reversibly engaged with the economizer outdoor air damper, and a condenser airflow across the condenser fan outlet or a condenser coil of the HVAC system or the box, wherein the box is configured to be in fluid communication with and reversibly engaged with the condenser fan outlet or the condenser coil inlet; and performing at least one action selected from the group consisting of:

positioning the hot-wire anemometer probe at a near side location disposed between a near side and a depth centerline of the box and taking a near side airflow measurement with the hot-wire anemometer probe while the hot-wire anemometer probe is in the single hole, positioning the hot-wire anemometer probe at a centerline location disposed midway between the near side and a far side of the box and taking a centerline airflow measurement with the hot-wire anemometer probe while the hot-wire anemometer probe is in the single hole, positioning the hot-wire anemometer probe at a far side location disposed between the far side and the depth centerline of the box and taking a far side airflow measurement with the hot-wire anemometer probe while the hot-wire anemometer probe is in the single hole, and calculating an average HVAC system airflow based on the at least one airflow measurement.

17. The method of claim 16, further comprising entering a cross sectional shape and dimensions of the box into a digital hot-wire anemometer tool, wherein the digital hot-wire anemometer tool is in electrical communication with the hot-wire anemometer probe.

18. The method of claim 16, further comprising adjusting the average HVAC system airflow by at least one of: repairing an economizer, wherein the economizer comprises an economizer controller, an economizer actuator, the economizer outdoor damper or an economizer return air damper, sealing an economizer perimeter gap around the economizer outdoor air damper or the economizer return air damper, repairing crushed or leaking ducts, repairing insulation blocking the airflow, opening registers, increasing duct size, increasing fan speed, defrosting and cleaning an evaporator coil, replacing a capacitor, cleaning a condenser coil, or cleaning a heat exchanger, wherein the economizer, the evaporator coil and the heat exchanger are disposed within the HVAC system and configured to change a temperature of the average HVAC system airflow.

19. The method of claim 16, further comprising reporting an energy efficiency ratio (EER*) improvement, wherein the EER* improvement is calculated based on one of:

measurements of an initial average HVAC system airflow and an initial temperature split across an evaporator coil and a final temperature split across the evaporator coil after adding refrigerant to an air conditioning system of the HVAC system, wherein temperature split across the evaporator coil is based on a return air drybulb temperature minus a supply air drybulb temperature, and the measurements of the initial average HVAC system airflow and the initial temperature split across the evaporator coil before adjusting the average HVAC system airflow and a final average HVAC system airflow and the final temperature split across the evaporator coil after adjusting the average HVAC system airflow.

* * * * *